US012157208B2

(12) United States Patent
Kubale et al.

(10) Patent No.: US 12,157,208 B2
(45) Date of Patent: Dec. 3, 2024

(54) IMPACT TOOL

(71) Applicant: MILWAUKEE ELECTRIC TOOL CORPORATION, Brookfield, WI (US)

(72) Inventors: Mark A. Kubale, West Bend, WI (US); Evan Brown, Milwaukee, WI (US); Andrew J. Weber, Cudahy, WI (US); Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 366 days.

(21) Appl. No.: 17/183,472

(22) Filed: Feb. 24, 2021

(65) Prior Publication Data

US 2021/0260734 A1 Aug. 26, 2021

Related U.S. Application Data

(60) Provisional application No. 62/980,706, filed on Feb. 24, 2020.

(51) Int. Cl.
*B25B 21/02* (2006.01)
*B25F 5/02* (2006.01)
*B25F 5/00* (2006.01)

(52) U.S. Cl.
CPC ............ *B25B 21/023* (2013.01); *B25F 5/026* (2013.01); *B25F 5/001* (2013.01)

(58) Field of Classification Search
CPC ......... B25B 21/023; B25F 5/026; B25F 5/001
See application file for complete search history.

(56) References Cited

U.S. PATENT DOCUMENTS 2,373,664 A 4/1945 Emery
2,373,667 A 4/1945 Emery
(Continued)

FOREIGN PATENT DOCUMENTS

CN 101186034 A 5/2008
CN 202684816 U 1/2013
(Continued)

OTHER PUBLICATIONS

International Search Report and Written Opinion for Application No. PCT/US2021/019316 dated Jun. 18, 2021 (14 pages).
(Continued)

*Primary Examiner* — Andrew M Tecco
*Assistant Examiner* — Nicholas E Igbokwe
(74) *Attorney, Agent, or Firm* — Michael Best & Friedrich LLP

(57) ABSTRACT

An impact tool includes a housing having a motor housing portion and an impact housing portion. The impact housing portion has a front end defining a front end plane. An electric motor is supported in the motor housing, a battery pack is supported by the housing for providing power to the motor, and a drive assembly is supported by the impact housing portion. The drive assembly includes an anvil extending from the front end of the front housing portion with an end defining an anvil end plane. The drive assembly also includes a hammer rotationally and axially movable relative to the anvil for imparting the consecutive rotational impacts upon the anvil, and a spring for biasing the hammer in an axial direction toward the anvil. A distance between the front end plane and the anvil end plane is greater than or equal to 6 inches.

20 Claims, 18 Drawing Sheets

(56) References Cited

U.S. PATENT DOCUMENTS 2,564,224 A 8/1951 Mitchell et al.
2,825,436 A 3/1958 Amtsberg
2,881,884 A 4/1959 Amtsberg
2,973,071 A 2/1961 James
3,068,973 A 12/1962 Maurer
3,070,201 A 12/1962 Spyridakis
3,156,334 A 11/1964 Hoza
3,250,153 A 5/1966 Purkey
3,352,368 A 11/1967 Maffey, Jr.
3,362,486 A 1/1968 Remi
3,369,615 A 2/1968 Maffey, Jr. et al.
3,606,931 A 9/1971 Karden
3,648,784 A 3/1972 Schoeps
3,804,180 A 4/1974 Gelfand et al.
4,002,212 A 1/1977 Schoeps
4,276,675 A 7/1981 Pioch
4,314,782 A 2/1982 Beekenkamp
4,505,170 A 3/1985 Van Laere
4,619,162 A 10/1986 Van Laere
4,719,976 A 1/1988 Bleicher et al.
4,790,218 A 12/1988 Cabrera
4,905,423 A 3/1990 Van Laere
4,977,966 A 12/1990 Farber et al.
5,049,012 A 9/1991 Cavedo
5,092,410 A 3/1992 Wallace et al.
D343,345 S 1/1994 Ogawa et al.
5,836,403 A 11/1998 Putney et al.
5,888,031 A 3/1999 Buck et al.
6,104,114 A 8/2000 Takeda et al.
6,158,526 A 12/2000 Ghode et al.
6,546,815 B2 4/2003 Yamada et al.
6,553,627 B1 4/2003 Horler
6,786,683 B2 9/2004 Schaer et al.
6,935,437 B2 8/2005 Zumisawa
7,032,685 B2 4/2006 Nakamizo
7,259,486 B2 8/2007 Yamamoto
7,401,663 B2 7/2008 Craven et al.
D590,681 S 4/2009 Palermo et al.
D591,130 S 4/2009 Palermo et al.
D606,377 S 12/2009 Ho
7,628,220 B2 12/2009 Barezzani et al.
7,673,702 B2 3/2010 Johnson et al.
7,823,256 B2 11/2010 Engelfried et al.
7,905,377 B2 3/2011 Krondorfer et al.
7,918,286 B2 4/2011 Nagasaka et al.
7,934,566 B2 5/2011 Hlinka et al.
8,032,990 B2 10/2011 Shinma et al.
8,069,929 B2 12/2011 Sugimoto et al.
8,127,974 B2 3/2012 Zhang et al.
8,230,607 B2 7/2012 Limberg et al.
8,272,452 B2 9/2012 Katou et al.
8,371,394 B2 2/2013 Grand
8,371,708 B2 2/2013 Nagasaka et al.
8,407,860 B2 4/2013 Brennenstuhl et al.
8,460,153 B2 6/2013 Rudolph et al.
8,584,770 B2 11/2013 Zhang et al.
8,827,003 B2 9/2014 Nagasaka et al.
8,925,645 B2 1/2015 Harada et al.
8,925,646 B2 1/2015 Seith et al.
8,961,358 B2 2/2015 Hirabayashi
9,114,521 B2 8/2015 Yoshikawa
9,308,638 B2 4/2016 Kondo et al.
9,321,159 B2 4/2016 May
9,393,711 B2 7/2016 Myrhum, Jr. et al.
9,415,497 B2 8/2016 Hecht et al.
9,463,566 B2 10/2016 Yoshikane et al.
9,566,692 B2 2/2017 Seith et al.
9,643,300 B2 5/2017 Kumagai et al.
9,849,577 B2 12/2017 Wyler et al.
D835,959 S 12/2018 Eardley
10,286,529 B2 5/2019 Kiyohara et al.
10,295,990 B2 5/2019 Dey, IV et al.
D853,815 S 7/2019 Yaschur et al.
10,654,153 B2 5/2020 Murakami et al.
11,858,109 B2 1/2024 Lachica Koch et al.
2001/0004939 A1 6/2001 Durmeyer et al.
2002/0035876 A1 3/2002 Robert, Jr.
2005/0121209 A1 6/2005 Shimizu et al.
2007/0000676 A1 1/2007 Arimura
2007/0209162 A1 9/2007 Mcroberts et al.
2007/0267206 A1 11/2007 Chen
2008/0078067 A1 4/2008 Nicolantonio et al.
2008/0099217 A1 5/2008 Seith et al.
2009/0000434 A1 1/2009 Shinma et al.
2009/0133894 A1 5/2009 Mizuhara
2009/0178520 A1 7/2009 Engelfried et al.
2010/0005629 A1 1/2010 Di Nicolantonio
2010/0064480 A1 3/2010 Martin
2010/0064481 A1 3/2010 Martin
2010/0064482 A1 3/2010 Martin
2010/0096155 A1 4/2010 Iwata et al.
2010/0149790 A1* 6/2010 Leong .................... B25F 5/021 362/119
2011/0011609 A1 1/2011 Simm et al.
2011/0073334 A1 3/2011 Iimura et al.
2011/0079407 A1 4/2011 Iimura et al.
2011/0120741 A1 5/2011 Limberg et al.
2011/0188232 A1 8/2011 Friedman et al.
2011/0315417 A1 12/2011 Matsunaga et al.
2012/0073846 A1 3/2012 Hirai et al.
2012/0199372 A1 8/2012 Nishikawa et al.
2012/0234566 A1 9/2012 Mashiko et al.
2012/0279736 A1 11/2012 Tanimoto et al.
2012/0292065 A1 11/2012 Hoshi et al.
2012/0292070 A1 11/2012 Ito et al.
2012/0312572 A1* 12/2012 Nemetz .................. B25F 5/006 248/220.22
2012/0318549 A1 12/2012 Nagasaka et al.
2012/0318550 A1 12/2012 Tanimoto et al.
2012/0319508 A1 12/2012 Oomori
2013/0000934 A1 1/2013 Tadokoro et al.
2013/0008679 A1 1/2013 Nishikawa et al.
2013/0014967 A1 1/2013 Ito et al.
2013/0025892 A1 1/2013 Mashiko et al.
2013/0062008 A1 3/2013 Haddad
2013/0062086 A1 3/2013 Ito et al.
2013/0075121 A1 3/2013 Nakamura et al.
2013/0087355 A1 4/2013 Oomori et al.
2013/0126202 A1 5/2013 Oomori et al.
2013/0133911 A1 5/2013 Ishikawa et al.
2013/0139614 A1 6/2013 Johnson et al.
2013/0233584 A1 9/2013 Mashiko
2013/0270932 A1 10/2013 Hatfield et al.
2013/0270934 A1 10/2013 Smith et al.
2013/0284480 A1 10/2013 Horie et al.
2013/0333910 A1 12/2013 Tanimoto et al.
2014/0014385 A1 1/2014 Kosugi et al.
2014/0069672 A1 3/2014 Mashiko et al.
2014/0124229 A1 5/2014 Takahashi et al.
2014/0131059 A1 5/2014 Verbrugge et al.
2014/0138114 A1 5/2014 Takeuchi et al.
2014/0144658 A1 5/2014 Schmid et al.
2014/0145524 A1 5/2014 Tanimoto et al.
2014/0158388 A1 6/2014 Johnson
2014/0158390 A1 6/2014 Mashiko et al.
2014/0182869 A1 7/2014 Kumagai et al.
2014/0223695 A1 8/2014 Rieger et al.
2014/0224075 A1 8/2014 Merrick
2014/0231113 A1 8/2014 Steurer
2014/0251649 A1 9/2014 Kondo
2014/0318821 A1* 10/2014 Wyler .................... B25F 5/006 173/104
2014/0371018 A1 12/2014 Ito
2014/0374130 A1 12/2014 Nakamura et al.
2015/0000946 A1 1/2015 Amend et al.
2015/0022125 A1 1/2015 Takano et al.
2015/0041169 A1 2/2015 Kumagai et al.
2015/0041170 A1 2/2015 Yoshikane et al.
2015/0047866 A1 2/2015 Sakai et al.
2015/0075829 A1 3/2015 Seith et al.
2015/0083448 A1 3/2015 Chen et al.
2015/0083451 A1 3/2015 Nishikawa
2015/0144365 A1 5/2015 Hirabayashi et al.
2015/0144366 A1 5/2015 Machida

(56) References Cited

U.S. PATENT DOCUMENTS

| | | | | |
|---|---|---|---|---|
| 2015/0144368 | A1 | 5/2015 | Machida | |
| 2015/0174753 | A1 | 6/2015 | Kamiya | |
| 2015/0209952 | A1 | 7/2015 | Nishii et al. | |
| 2015/0231770 | A1 | 8/2015 | Kusakawa et al. | |
| 2015/0231771 | A1 | 8/2015 | Sakai et al. | |
| 2015/0266176 | A1 | 9/2015 | Takeuchi et al. | |
| 2015/0303842 | A1 | 10/2015 | Takano et al. | |
| 2015/0333664 | A1 | 11/2015 | Bantle | |
| 2015/0336249 | A1 | 11/2015 | Iwata et al. | |
| 2015/0343617 | A1* | 12/2015 | Kondo | B25B 21/02 173/93 |
| 2015/0352699 | A1 | 12/2015 | Sakai et al. | |
| 2016/0008961 | A1 | 1/2016 | Takano et al. | |
| 2016/0075007 | A1 | 3/2016 | Kutsuna et al. | |
| 2016/0079887 | A1 | 3/2016 | Takano et al. | |
| 2016/0107297 | A1 | 4/2016 | Ishikawa et al. | |
| 2016/0129568 | A1 | 5/2016 | Nishikawa et al. | |
| 2016/0136801 | A1 | 5/2016 | Furusawa et al. | |
| 2016/0250743 | A1 | 9/2016 | Kikuchi et al. | |
| 2016/0279782 | A1 | 9/2016 | Ullrich et al. | |
| 2016/0288308 | A1 | 10/2016 | Kuhnle et al. | |
| 2016/0311102 | A1* | 10/2016 | Ebner | H01M 50/247 |
| 2016/0325415 | A1 | 11/2016 | Huber et al. | |
| 2016/0354905 | A1 | 12/2016 | Ely et al. | |
| 2017/0021478 | A1 | 1/2017 | Junkers et al. | |
| 2017/0028537 | A1 | 2/2017 | McClung et al. | |
| 2017/0036327 | A1 | 2/2017 | Murakami et al. | |
| 2017/0057064 | A1 | 3/2017 | Ishikawa et al. | |
| 2017/0106517 | A1* | 4/2017 | Machida | B25D 16/00 |
| 2017/0106525 | A1* | 4/2017 | Brauer | B25G 1/06 |
| 2017/0144278 | A1 | 5/2017 | Nishikawa et al. | |
| 2017/0151657 | A1 | 6/2017 | Nagasaka et al. | |
| 2017/0173768 | A1 | 6/2017 | Dey, IV et al. | |
| 2017/0190027 | A1 | 7/2017 | Koizumi et al. | |
| 2017/0190028 | A1 | 7/2017 | Howard et al. | |
| 2017/0190032 | A1 | 7/2017 | Leong et al. | |
| 2017/0239801 | A1 | 8/2017 | Kondo et al. | |
| 2017/0246732 | A1 | 8/2017 | Dey, IV et al. | |
| 2017/0312902 | A1* | 11/2017 | Noguchi | B25D 17/24 |
| 2017/0326712 | A1 | 11/2017 | Li et al. | |
| 2017/0326720 | A1 | 11/2017 | Kuroyanagi et al. | |
| 2017/0348835 | A1 | 12/2017 | Skelly et al. | |
| 2018/0001444 | A1 | 1/2018 | Matsushita et al. | |
| 2018/0117745 | A1 | 5/2018 | Murakami et al. | |
| 2018/0200872 | A1 | 7/2018 | Leong | |
| 2018/0222022 | A1 | 8/2018 | Kumagai et al. | |
| 2019/0030692 | A1 | 1/2019 | Harada et al. | |
| 2019/0030696 | A1 | 1/2019 | Seith et al. | |
| 2019/0224819 | A1 | 7/2019 | Kiyohara et al. | |
| 2019/0255687 | A1* | 8/2019 | Schneider | B25B 21/02 |
| 2020/0009709 | A1 | 1/2020 | Kumagai et al. | |
| 2020/0122281 | A1 | 4/2020 | Wierer et al. | |
| 2020/0180124 | A1 | 6/2020 | Ellice et al. | |
| 2020/0198100 | A1 | 6/2020 | Schneider et al. | |
| 2020/0262037 | A1 | 8/2020 | Schneider et al. | |
| 2021/0100170 | A1 | 4/2021 | Suzuki | |
| 2021/0237249 | A1 | 8/2021 | Fischer et al. | |
| 2021/0260733 | A1 | 8/2021 | Fischer et al. | |

FOREIGN PATENT DOCUMENTS

| | | | | |
|---|---|---|---|---|
| CN | 203843800 U | | 9/2014 | |
| CN | 206122746 U | | 4/2017 | |
| CN | 206702908 U | | 12/2017 | |
| CN | 109500432 A | | 3/2019 | |
| CN | 209139897 U | | 7/2019 | |
| CN | 209812185 U | * | 12/2019 | B25F 5/00 |
| DE | 19738092 C1 | | 12/1998 | |
| DE | 102007039245 | | 5/2008 | |
| EP | 2944433 B1 | | 6/2017 | |
| EP | 3706960 | | 9/2020 | |
| JP | 2008183691 A | | 8/2008 | |
| JP | 2016097498 A | | 5/2016 | |
| JP | 2017080853 A | | 5/2017 | |

OTHER PUBLICATIONS

Ingersoll Rand, "Air Impact Wrench 2850MAX and 2850MAX-6" Product Information, Edition 3, Feb. 2018, 32 pages.

Ingersoll Rand, "285B Series Air Impact Wrench—Exploded View", Edition 7, Jan. 2014, 2 pages.

Ingersoll Rand, "2850MAX Series Air Impactools™—Exploded View", Edition 3, Feb. 2018, 2 pages.

Ingersoll Rand, "1" D-Handle Impact Wrench 2850MAX and 2850MAX-6", Informational Flyer, 2018, 2 pages.

Ingersoll Rand, "Air Impact Wrench Series 285B and 295A" Product Information, Edition 5, Jan. 2014, 36 pages.

International Search Report and Written Opinio for Application No. PCT/US2019/064583 dated Apr. 10, 2020 (12 pages).

Beacham, "Best Rotary Hammers," available at <https://bestreviews.com/tools/hammers/best-rotary-hammers> dated Oct. 1, 2021 (2 pages).

Musyoka et al., "Best Rotary Hammers: Drill and Chisel More Efficiently," available at <https://www.thedrive.com/reviews/31029/best-rotary-hamer-drill> dated Aug. 20, 2021 (9 pages).

Extended European Search Report for Application No. 21760776.1 dated Feb. 27, 2024 (9 pages).

* cited by examiner

IMPACT TOOL

CROSS-REFERENCE TO RELATED APPLICATIONS

The present application claims priority to U.S. Provisional Patent Application No. 62/980,706, filed Feb. 24, 2020, the entire content of which is incorporated herein by reference.

FIELD OF THE INVENTION

The present invention relates to power tools, and more specifically to impact tools.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools.

SUMMARY OF THE INVENTION

The present invention provides, in one aspect, an impact tool comprising a housing including a motor housing portion and an impact housing portion. The impact housing portion has a front end defining a front end plane. The impact tool further comprises an electric motor supported in the motor housing, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil extending from the front end of the front housing portion. The anvil has an end defining an anvil end plane. The drive assembly also includes a hammer that is both rotationally and axially movable relative to the anvil for imparting the consecutive rotational impacts upon the anvil, and a spring for biasing the hammer in an axial direction toward the anvil. A distance between the front end plane and the anvil end plane is greater than or equal to 6 inches.

The present invention provides, in another aspect, an impact tool comprising a housing including a motor housing portion and an impact housing portion. The impact housing portion has a front end defining a front end plane. The impact tool further comprises an electric motor supported in the motor housing and defining a motor axis, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil, a hammer that is both rotationally and axially movable relative to the anvil for imparting the consecutive rotational impacts upon the anvil, and a spring for biasing the hammer in an axial direction toward the anvil. The impact tool further includes an auxiliary handle assembly including a collar arranged on the impact housing portion and a handle coupled to the collar. The collar defines a handle plane that extends centrally through the collar, orthogonal to the motor axis, and that is parallel to the front end plane. A distance between the front end plane and the handle plane is greater than or equal to 6 inches.

The present invention provides, in yet another aspect, an impact tool comprising a housing including a motor housing portion, an impact housing portion, and a handle portion having a rear surface defining a rear end of the impact tool and defining a rear end plane. The impact tool further comprises an electric motor supported in the motor housing, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil having an end defining an anvil end plane, a hammer that is both rotationally and axially movable relative to the anvil for imparting the consecutive rotational impacts upon the anvil, and a spring for biasing the hammer in an axial direction toward the anvil. A distance between the rear end plane and the anvil end plane is less than or equal to 19.5 inches.

The present invention provides, in yet another aspect, an impact tool comprising a housing including a motor housing portion, an impact housing portion, and a handle portion having a rear surface defining a rear end of the impact tool and defining a rear end plane. The impact tool further comprises an electric motor supported in the motor housing and defining a motor axis, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil, a hammer that is both rotationally and axially movable relative to the anvil for imparting the consecutive rotational impacts upon the anvil, and a spring for biasing the hammer in an axial direction toward the anvil. The impact tool further comprises an auxiliary handle assembly including a collar arranged on the impact housing portion and a handle coupled to the collar. The collar defines a handle plane that extends centrally through the collar and orthogonal to the motor axis. A distance between the rear end plane and the handle plane is less than or equal to 13.5 inches.

The present invention provides, in yet another aspect, an impact tool comprising a housing including a motor housing portion and an impact housing portion. The impact housing portion has a bore. The impact tool further comprises an electric motor supported in the motor housing, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil, a hammer that is both rotationally and axially movable relative to the anvil for imparting the consecutive rotational impacts upon the anvil, and a spring for biasing the hammer in an axial direction toward the anvil. The impact tool further comprises an auxiliary handle assembly including a collar and a handle coupled to the collar. The collar includes a collar lock assembly including a detent moveable between a first position, in which the detent is arranged in the bore of the impact housing portion and the collar is rotationally locked with respect to the impact housing portion, and a second position, in which the detent is out of the bore and the collar is rotationally moveable with respect to the impact housing portion.

The present invention provides, in yet another aspect, an impact tool comprising a housing including a motor housing portion and an impact housing portion, an electric motor supported in the motor housing, a battery pack supported by the housing for providing power to the motor, and a drive assembly supported by the impact housing portion. The drive assembly is configured to convert a continuous rotational input from the motor to consecutive rotational impacts upon a workpiece. The drive assembly includes an anvil, a hammer that is both rotationally and axially movable relative to the anvil for imparting the consecutive rotational impacts upon the anvil, and a spring for biasing the hammer in an axial direction toward the anvil. The impact tool further comprises an auxiliary handle assembly including a collar arranged on the impact housing portion and a handle coupled to the collar. The handle includes a handle lock assembly switchable between a first state, in which the handle is pivotal with respect to the collar, and a second state, in which the handle is locked with respect to the collar.

The present invention provides, in yet another aspect, an impact tool comprising a housing including a motor housing portion and handle portion having a grip. An aperture is defined between the grip and the motor housing portion. The impact tool further comprises an electric motor supported in the motor housing, a battery pack supported by the housing for providing power to the motor, and a drive assembly configured to convert a continuous rotational input from the motor to consecutive rotational impacts upon a workpiece. The drive assembly includes an anvil, a hammer that is both rotationally and axially movable relative to the anvil for imparting the consecutive rotational impacts upon the anvil, and a spring for biasing the hammer in an axial direction toward the anvil. The impact tool further comprises a trigger on the grip and arranged in the aperture. The trigger is configured to activate the motor. The impact tool further comprises an actuator on a top surface of the handle portion. The actuator is moveable between a first position and a second position. In response to the actuator being in the first position, the motor is configured to rotate in a first direction. In response to the actuator being the second position, the motor is configured to rotate in a second direction that is opposite the first direction.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
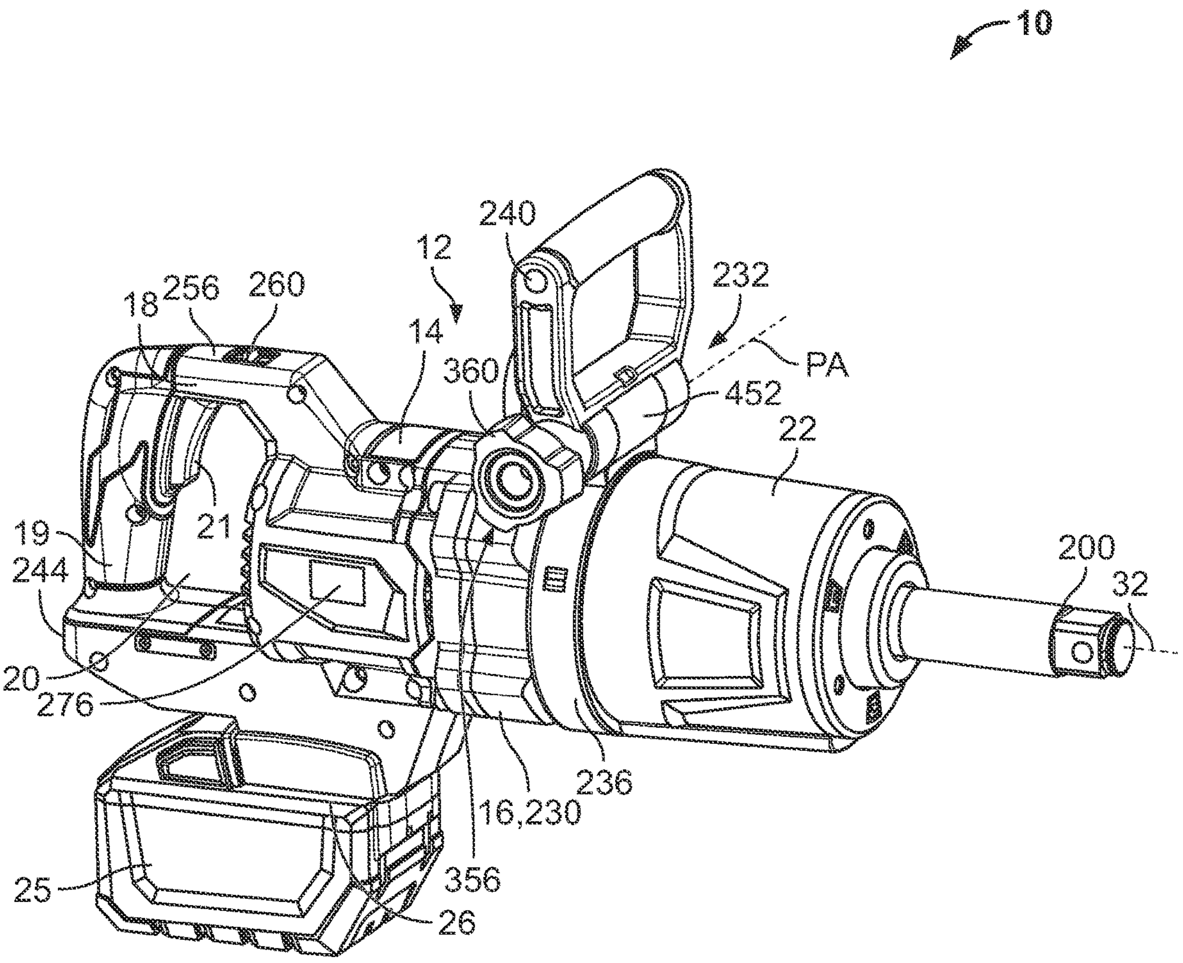
FIG. 1 is a perspective view of an impact wrench according to one embodiment.
Figure 2:
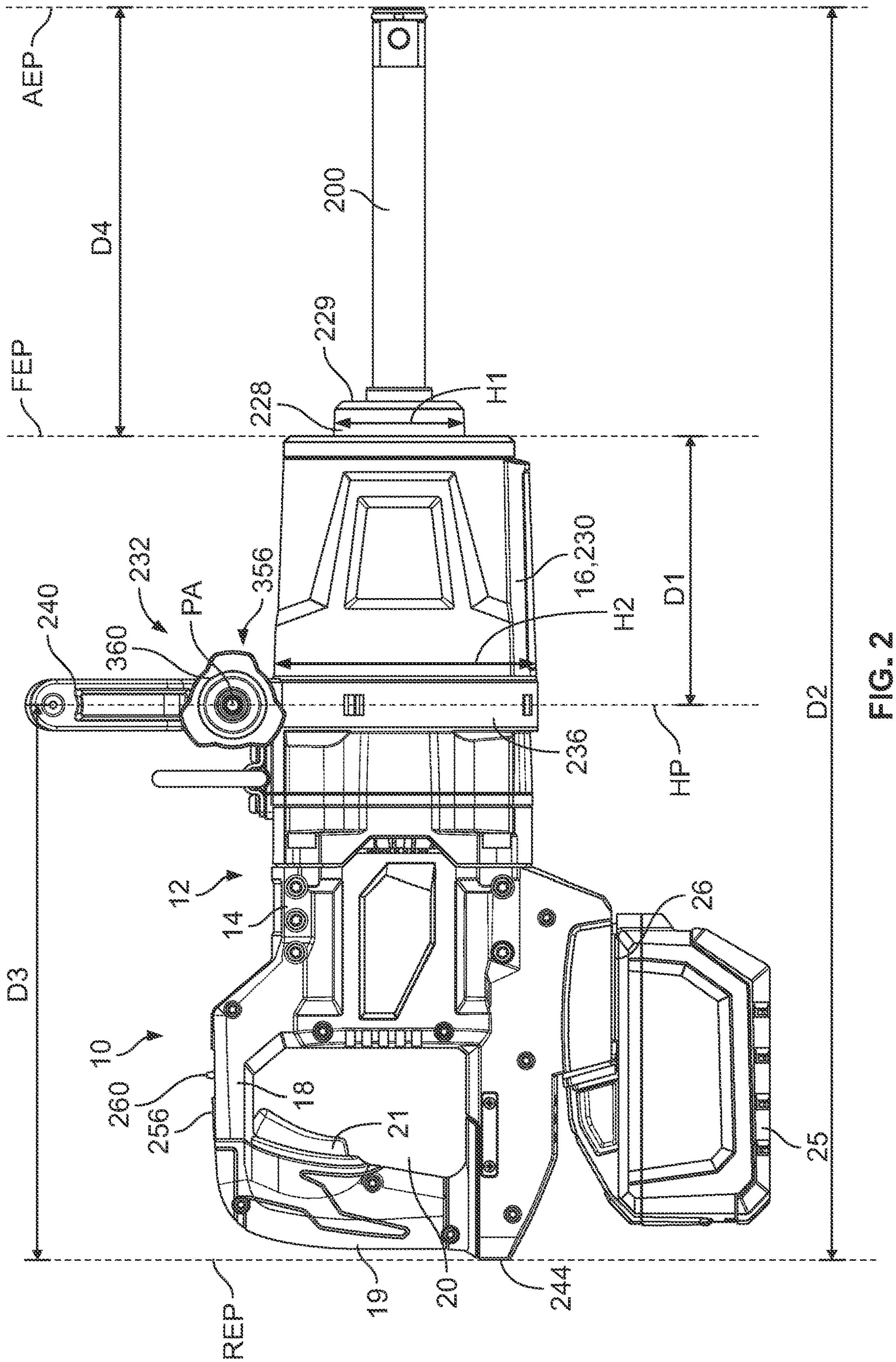
FIG. 2 is a plan view of the impact wrench of FIG. 1, with a boot removed.

FIGS. 1 and 2 illustrate a power tool in the form of an impact tool or impact wrench 10. The impact wrench 10 includes a housing 12 with a motor housing portion 14, an impact housing portion 16 coupled to the motor housing portion 14 (e.g., by a plurality of fasteners), and a generally D-shaped handle portion 18 disposed rearward of the motor housing portion 14. The handle portion 18 includes a grip 19 that can be grasped by a user operating the impact wrench 10. The grip 19 is spaced from the motor housing portion 14 such that an aperture 20 is defined between the grip 19 and the motor housing portion 14. As shown in FIGS. 1 and 2, a trigger 21 extends from the grip 19 into the aperture 20. In the illustrated embodiment, the handle portion 18 and the motor housing portion 14 are defined by cooperating clamshell halves, and the impact housing portion 16 is a unitary body. As shown in FIG. 1, an elastomeric (e.g. rubber) boot 22 at least partially covers the impact housing portion 16 for protection. The boot 22 may be permanently affixed to the impact housing portion 16 or removable and replaceable.

With continued reference to FIGS. 1 and 2, the impact wrench 10 includes a battery pack 25 removably coupled to a battery receptacle 26 on the housing 12. The battery pack 25 preferably has a nominal capacity of at least 5 Amp-hours (Ah) (e.g., with two strings of five series-connected battery cells (a "5S2P" pack)). In some embodiments, the battery pack 25 has a nominal capacity of at least 9 Ah (e.g., with three strings of five series-connected battery cells (a "5S3P pack"). The illustrated battery pack 25 has a nominal output voltage of at least 18 V. The battery pack 25 is rechargeable, and the cells may have a Lithium-based chemistry (e.g., Lithium, Lithium-ion, etc.) or any other suitable chemistry.

Figure 3:
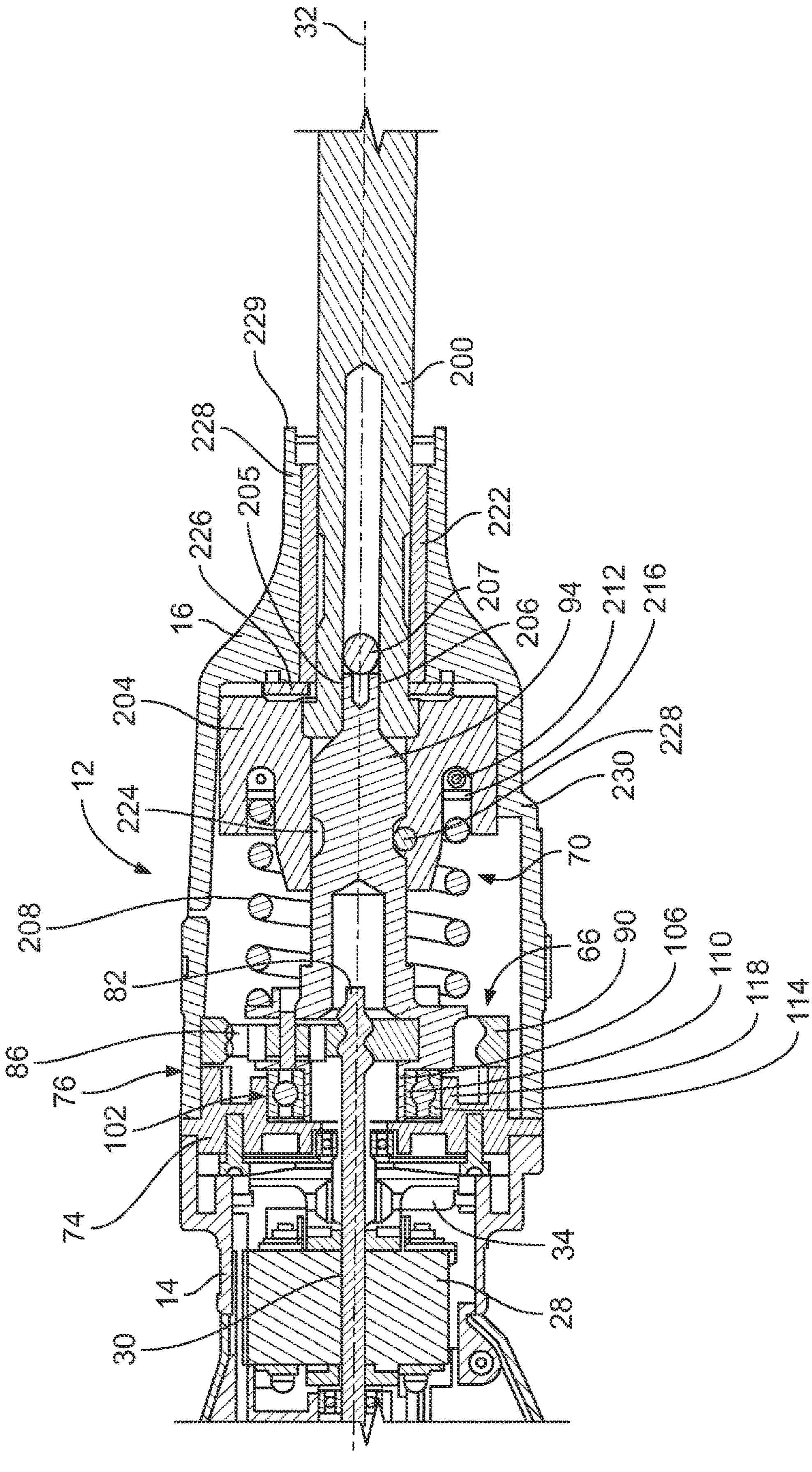
FIG. 3 is an enlarged, cross-sectional view of the impact wrench of FIG. 1, with portions removed.

Referring to FIG. 3, an electric motor 28, supported within the motor housing portion 14, receives power from the battery pack 25 (FIG. 1) when the battery pack 25 is coupled to the battery receptacle 26. The illustrated motor 28 is a brushless direct current ("BLDC") motor with a rotor or output shaft 30 that is rotatable about a motor axis 32. A fan 34 is coupled to the output shaft 30 (e.g., via a splined connection) adjacent a front end of the motor 28.

In some embodiments, the impact wrench 10 may include a power cord for electrically connecting the motor 28 to a source of AC power. As a further alternative, the impact wrench 10 may be configured to operate using a different power source (e.g., a pneumatic power source, etc.). The battery pack 25 is the preferred means for powering the impact wrench 10, however, because a cordless impact wrench advantageously requires less maintenance (e.g., no oiling of air lines or compressor motor) and can be used in locations where compressed air or other power sources are unavailable.

With reference to FIG. 3, the impact wrench 10 further includes a gear assembly 66 coupled to the motor output shaft 30 and a drive assembly 70 coupled to an output of the gear assembly 66. The gear assembly 66 is supported within the housing 12 by a support 74, which is coupled between the motor housing portion 14 and the impact housing portion 16 in the illustrated embodiment. The support 74 separates the interior of the motor housing portion 14 from the interior of the impact housing portion 16, and the support 74 and the impact housing portion 16 collectively define a gear case 76, with the support 74 defining the rear wall of the gear case 76. The gear assembly 66 may be configured in any of a number of different ways to provide a speed reduction between the output shaft 30 and an input of the drive assembly 70.

The illustrated gear assembly 66 includes a helical pinion 82 formed on the motor output shaft 30, a plurality of helical planet gears 86, and a helical ring gear 90. The output shaft 30 extends through the support 74 such that the pinion 82 is received between and meshed with the planet gears 86. The helical ring gear 90 surrounds and is meshed with the planet gears 86 and is rotationally fixed within the gear case 76 (e.g., via projections (not shown) on an exterior of the ring gear 90 cooperating with corresponding grooves (not shown) formed inside impact housing portion 16). The planet gears 86 are mounted on a camshaft 94 of the drive assembly 70 such that the camshaft 94 acts as a planet carrier for the planet gears 86.

Accordingly, rotation of the output shaft 30 rotates the planet gears 86, which then advance along the inner circumference of the ring gear 90 and thereby rotate the camshaft 94. In the illustrated embodiment, the gear assembly 66 provides a gear ratio from the output shaft 30 to the camshaft 94 between 10:1 and 14:1; however, the gear assembly 66 may be configured to provide other gear ratios.

With continued reference to FIG. 3, the camshaft 94 is rotationally supported at its rear end (i.e. the end closest to the motor 28) by a radial bearing 102. In particular, the camshaft 94 includes a bearing seat 106 between the planet gears 86 and the rear end of the camshaft 94. An inner race 110 of the bearing 102 is coupled to the bearing seat 106. An outer race 114 of the bearing 102 is coupled to a bearing retainer 118 formed in the support 74.

With continued reference to FIG. 3, the drive assembly 70 includes an anvil 200, extending from the impact housing portion 16, to which a tool element (e.g., a socket; not shown) can be coupled for performing work on a workpiece (e.g., a fastener). The drive assembly 70 is configured to convert the continuous rotational force or torque provided by the motor 28 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

The camshaft 94 includes a cylindrical projection 205 adjacent the front end of the camshaft 94. The cylindrical projection 205 is smaller in diameter than the remainder of the camshaft 94 and is received within a pilot bore 206 extending through the anvil 200 along the motor axis 32. The engagement between the cylindrical projection 205 and the pilot bore 206 rotationally and radially supports the front end of the camshaft 94. A ball bearing 207 is seated within the pilot bore 206. The cylindrical projection abuts the ball bearing 207, which acts as a thrust bearing to resist axial loads on the camshaft 94.

Thus, in the illustrated embodiment, the camshaft 94 is rotationally and radially supported at its rear end by the bearing 102 and at its front end by the anvil 200. Because the radial position of the planet gears 86 on the camshaft 94 is fixed, the position of the camshaft 94 sets the position of the planet gears 86. In the illustrated embodiment, the ring gear 90 is coupled to the impact housing portion 16 such that the ring gear 90 may move radially to a limited extent or "float" relative to the impact housing portion 16. This facilitates alignment between the planet gears 86 and the ring gear 90.

The drive assembly 70 further includes a spring 208 biasing the hammer 204 toward the front of the impact wrench 10 (i.e., in the right direction of FIG. 3). In other words, the spring 208 biases the hammer 204 in an axial direction toward the anvil 200, along the motor axis 32. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs (not shown)

on the hammer 204 engage and impact corresponding anvil lugs to transfer kinetic energy from the hammer 204 to the anvil 200.

The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs and the anvil lugs are engaged and the camshaft 94 continues to rotate. A bushing 222 is disposed within the impact housing 16 of the housing to rotationally support the anvil 200. A washer 226, which in some embodiments may be an integral flange portion of bushing 222, is located between the anvil 200 and a front end of the impact housing portion 16. In some embodiments, multiple washers 226 may be provided as a washer stack.

In operation of the impact wrench 10, an operator activates the motor 28 by depressing the trigger 21, which continuously drives the gear assembly 66 and the camshaft 94 via the output shaft 30. As the camshaft 94 rotates, the cam balls 228 drive the hammer 204 to co-rotate with the camshaft 94, and the hammer lugs engage, respectively, driven surfaces of the anvil lugs to provide an impact and to rotatably drive the anvil 200 and the tool element. After each impact, the hammer 204 moves or slides rearward along the camshaft 94, away from the anvil 200, so that the hammer lugs disengage the anvil lugs 220.

As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs disengage the respective anvil lugs, the hammer 204 continues to rotate and moves or slides forwardly, toward the anvil 200, as the spring 208 releases its stored energy, until the drive surfaces of the hammer lugs re-engage the driven surfaces of the anvil lugs to cause another impact.

With reference to FIG. 2, the impact housing portion 16 includes a front portion 228 from which the anvil 200 extends. The front portion 228 of the impact housing portion 16 includes a front end 229 defining a front end plane FEP. The impact housing portion 16 also includes a rear portion 230 that is between the front portion 228 and the motor housing portion 14. The front portion 228 has a first height H1 and the rear portion 230 has a second height H2 that is greater than H1. In some embodiments, H1 is 3.1 inches and H2 is 5.2 inches. In some embodiments, a ratio between the second height H2 and the first height H1 is between 1.5 and 2.0.

As shown in FIGS. 1 and 2, the impact wrench 10 also includes an auxiliary handle assembly 232 including a collar 236 coupled to the rear portion 230 of the impact housing portion 16 and a handle 240 pivotally coupled to the collar 236. As shown in FIG. 2, the collar 236 defines a handle plane HP that extends centrally through the collar, orthogonal to the motor axis 32, and that is parallel to the front end plane FEP. In some embodiments, a first distance D1 between the front end plane FEP and the handle plane HP is greater than or equal to six inches, which ensures that the handle 240 is outside a truck wheel rim if the anvil 200 with, for example, a minimum one inch length socket attached, is extended into the rim and used to fasten or loosen a nut in the rim.

With continued reference to FIG. 2, the grip 19 includes a rear surface 244 that defines a rearmost point of the impact wrench 10 and a rear end plane REP that is parallel to the front end plane FEP. As also shown in FIG. 2, the anvil 200 has an end 248 defining an anvil end plane AEP. In some embodiments, a second distance D2 between the rear end plane REP and anvil end plane AEP is less than or equal to 19.5 inches. In some embodiments, a third distance D3 between the handle plane HP and the rear end plane REP is less than or equal to 13.5 inches. In some embodiments, a fourth distance D4 between the front end plane FEP and the anvil end plane AEP is greater than or equal to 6 inches, such that the anvil 200 is able to extend into a truck rim to fasten or loosen a nut in the truck wheel rim.

As shown in FIGS. 1 and 2, the handle portion 18 includes top surface 256 on which a forward/reverse actuator 260 is arranged. The forward/reverse actuator 260 is moveable between a first position, in which the output shaft 30 and thus the anvil 200 rotate about the motor axis 32 in a first (e.g. tightening) direction, and a second position, in which the output shaft 30 and thus the anvil 200 rotate about the motor axis 32 in a second (e.g. loosening) direction. In some embodiments, the actuator 260 is also movable to a third position, for example, between the first and second positions in which the motor 28 is inhibited from being activated in response to the trigger 21 being actuated. As such, when the actuator 260 is in the third position, the impact wrench 10 is in a “neutral” state, in which the impact wrench 10 may be placed during transport to avoid accidental activation of the motor 28. Because the forward/reverse actuator 260 is on the top surface 256, the impact wrench 10 may be operated by a user with one hand. Specifically, the operator may grasp the grip 19 with middle, ring, and pinkie fingers, while operating the trigger 21 with the index finger and the forward/reverse actuator 260 with the thumb.

Figure 4:
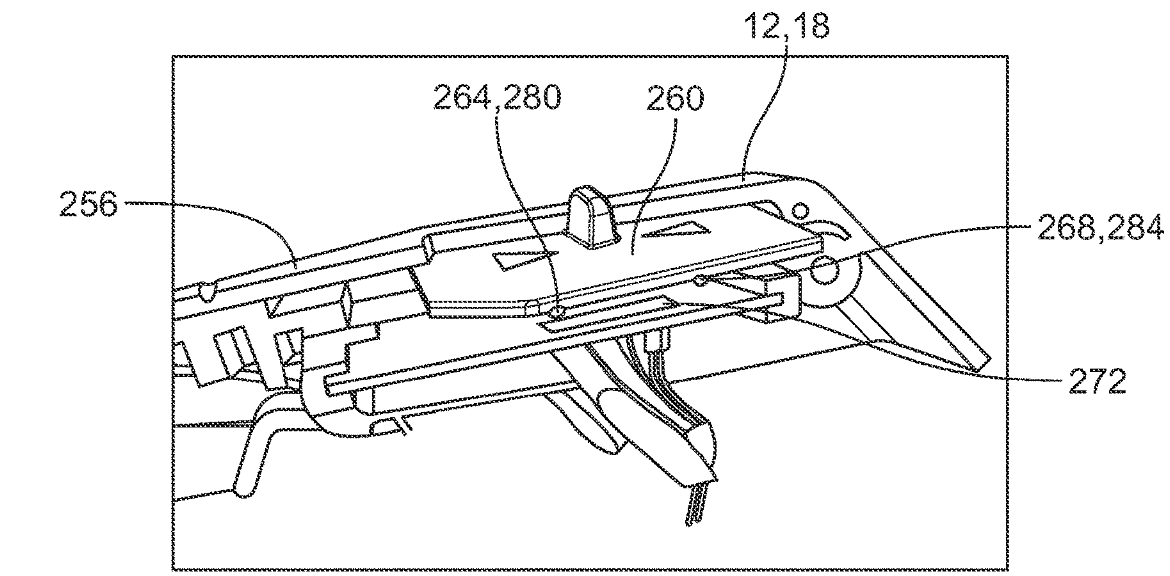
FIG. 4 is a perspective view of a forward/reverse actuator of the impact wrench of FIG. 1, with the forward/reverse actuator in a first position.
Figure 5:
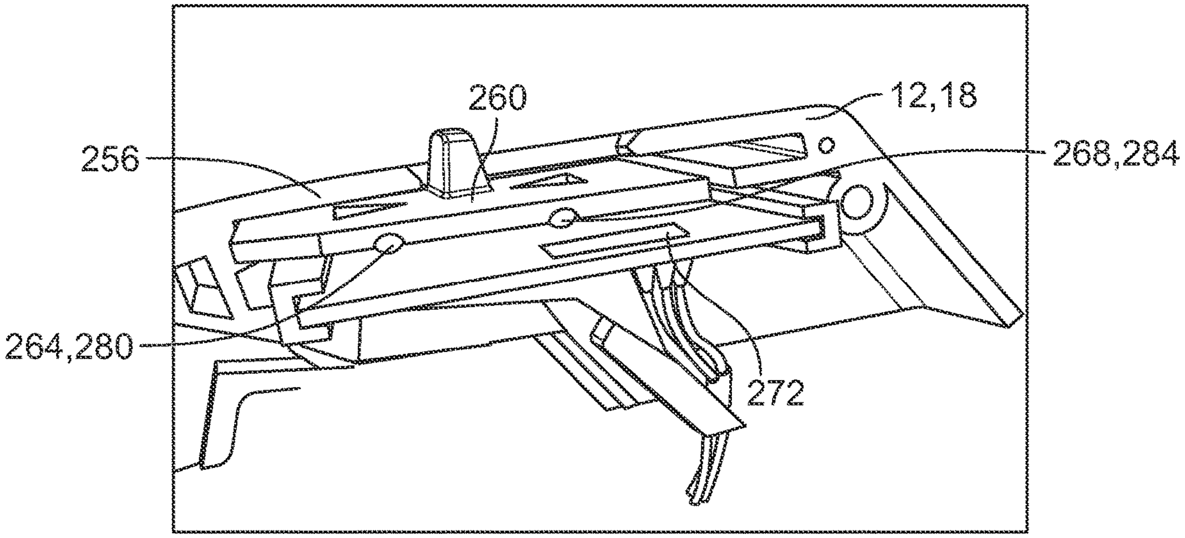
FIG. 5 is a perspective view of a forward/reverse actuator of the impact wrench of FIG. 1, with the forward/reverse actuator in a second position.
Figure 6:
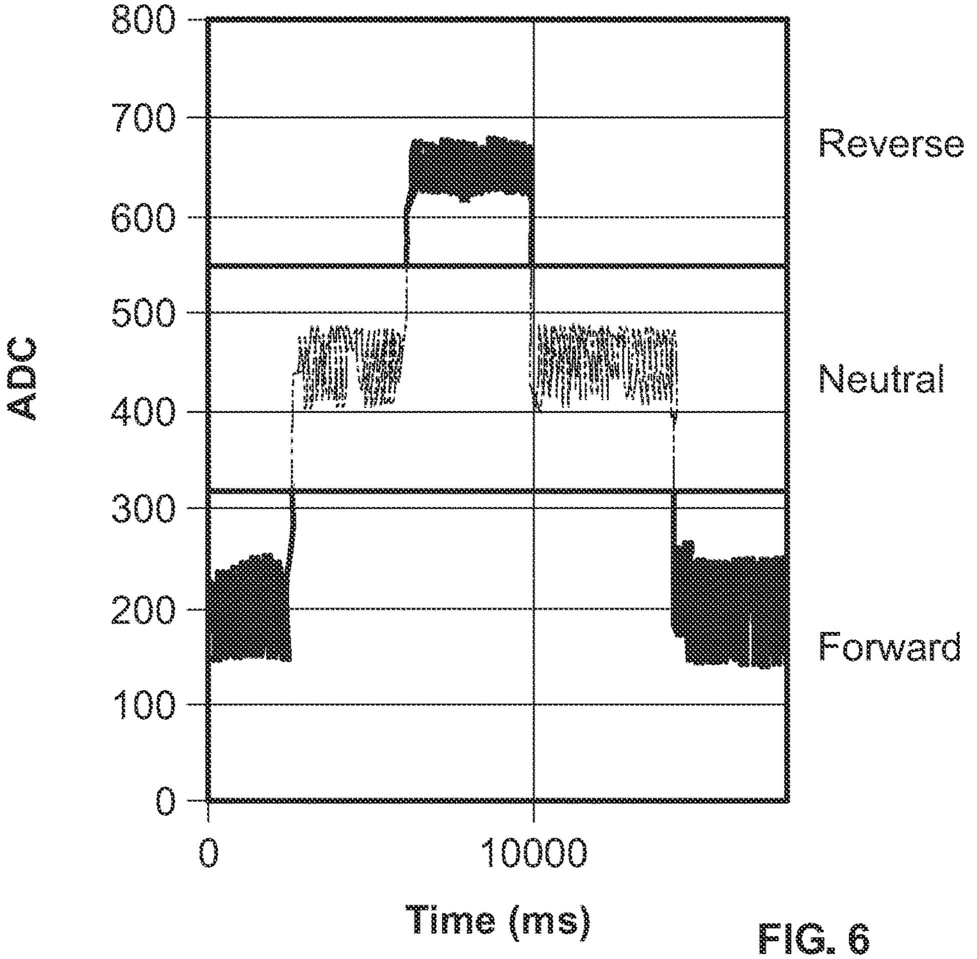
FIG. 6 is a graph showing ADC readings based on first, second and third positions of the forward/reverse switch of FIG. 4.

In some embodiments, the forward/reverse actuator 260 is a mechanical shuttle that slides between the first (FIG. 4) and second (FIG. 5) positions. In the embodiment of FIGS. 4-6, the forward/reverse actuator 260 has a first magnet 264 and a second magnet 268, and a sensor, such as an inductive sensor 272, is arranged underneath the forward/reverse actuator 260 in the handle portion 18. The inductive sensor 272 is in electrical communication with a motor control unit (MCU) 276 (shown schematically in FIG. 1) that is configured to control the motor 28. The MCU 276 is also in electrical communication with the motor 28 and trigger 21.

The first magnet 264 has a south pole end 280 aligned with the inductive sensor 272, such that when the forward/reverse actuator 260 is in the first position, the south pole end 280 is arranged proximate the inductive sensor 272. When voltage is applied to the inductive sensor 272, an electromagnetic field is created. Based on Faraday’s Law of Induction, a voltage will be induced in the first magnet 264 in response to relative movement between the south pole end 280 of the first magnet 264 and the magnetic field of the inductive sensor 272, which, in turn, produces Eddy currents in the first magnet 264 that oppose the electromagnetic field created by the inductive sensor 272. This changes the inductance of the inductive sensor 272, which can be measured and used as an indicator of the presence or physical proximity of the first magnet 264 relative to the inductive sensor 272. Specifically, the MCU 276 uses an analog to digital (ADC) reading representative of the change in inductance of the inductive sensor 272 to determine that it is the south pole end 280 of the first magnet 264 that is moved over the inductive sensor 272, when the ADC reading generates a number between 0 and approximately 310 (see FIG. 6), which indicates that the motor 28 and anvil 200 should be rotated in the first (e.g. forward, tightening) direction.

The second magnet 268 has a north pole end 284 aligned with the inductive sensor 272, such that when the forward/reverse actuator 260 is in the second position, the north pole end 284 is arranged proximate the inductive sensor 272. Based on Faraday's Law of Induction, a voltage will be induced in the second magnet 268 in response to relative movement between the second magnet 268 and the magnetic field of the inductive sensor 272, which, in turn, produces Eddy currents in the second magnet 268 that oppose the electromagnetic field created by the inductive sensor 272. This changes the inductance of the inductive sensor 272, which can be measured and used as an indicator of the presence or physical proximity of the second magnet 268 relative to the inductive sensor 272. Specifically, the MCU 276 uses the ADC reading representative of the change in inductance of the inductive sensor 272 to determine that it was the north pole end 284 of the second magnet 268 that was moved over the inductive sensor 272, when the ADC reading generates a number between approximately 540 and approximately 625 (based on a hexadecimal system) (see FIG. 6), which indicates that the motor 28 and anvil 200 should be rotated in the second (e.g. reverse, loosening) direction.

The forward/reverse actuator 260 is also moveable to a third "neutral" position between the first and second positions, in which the motor 28 will remain deactivated, even if the trigger 21 is pulled. In the third position, neither the first magnet 264 nor the second magnet 268 are arranged proximate the inductive sensor 272, such that no magnetic field is generated and the MCU 276 uses the ADC reading to determine that neither of the first or second magnets 264, 268 are over the inductive sensor 272, when the ADC reading generates a number between approximately 310 and approximately 540 (see FIG. 6), which indicates that the motor 28 and anvil 200 should not be rotated even if the trigger 21 is pulled.

Figure 7:
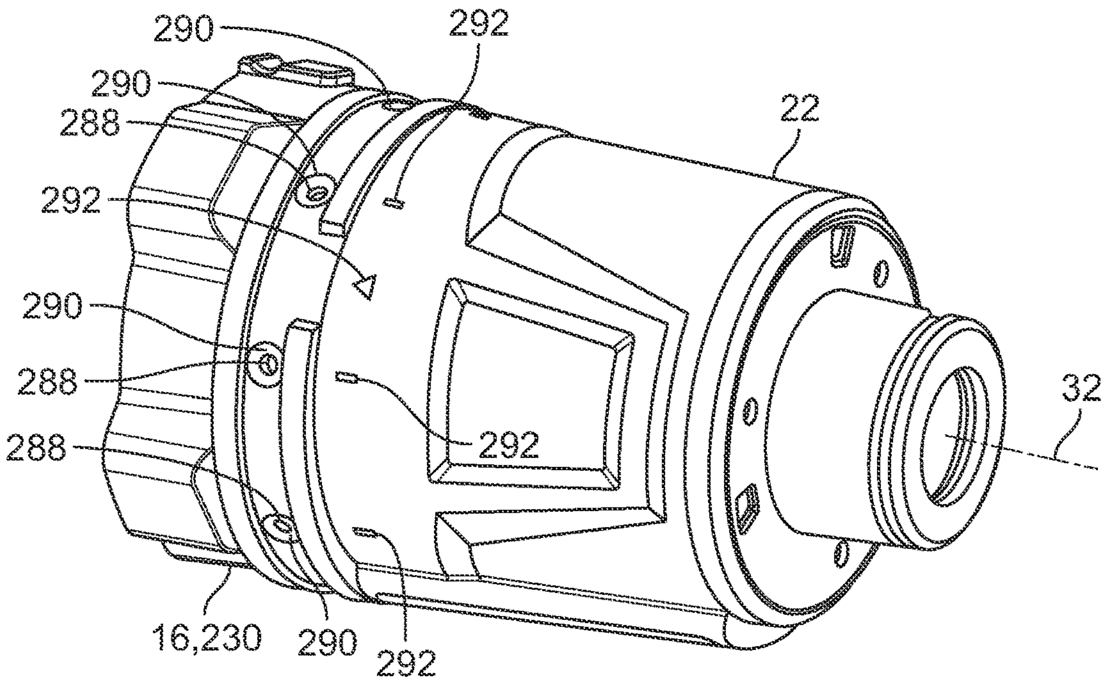
FIG. 7 is a perspective view of an impact housing of the impact wrench of FIG. 1, with portions removed.
Figure 8:
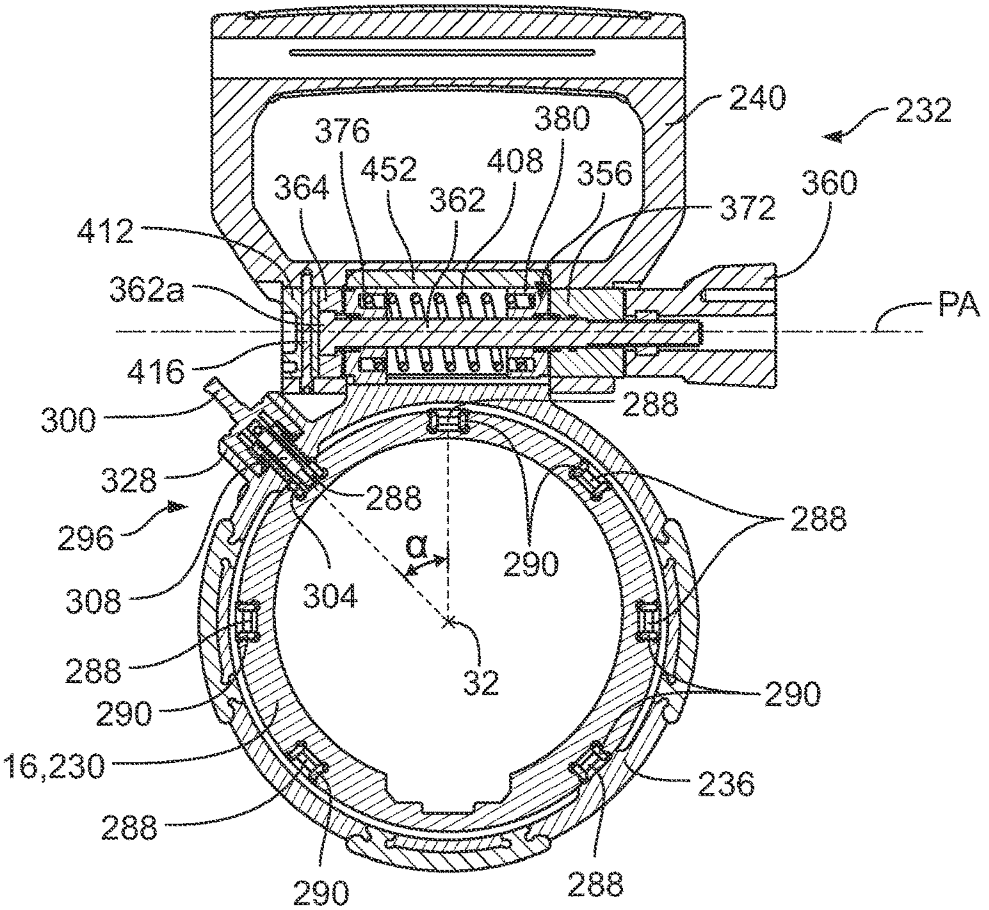
FIG. 8 is a cross-sectional view of an auxiliary handle assembly of the impact wrench of FIG. 1.

As shown in FIGS. 7 and 8, the rear portion 230 of the impact housing portion 16 includes a plurality of radial bores 288 that facilitate mounting of the collar 236 to the rear portion 230 of the impact housing portion 16. In the illustrated embodiment, the bores 288 are formed in steel inserts 290 in the collar 236. And, the bores 288 arranged at angles α with respect to one another. In the illustrated embodiment, a is 45 degrees but in other embodiments, a can be greater or less than 45 degrees. As shown in FIG. 7, the rubber boot 22 has a plurality of indicia 292 to indicate the various potential rotational positions of the collar 236 with respect to the impact housing 16. The collar 236 is arranged about and axially aligned with the plurality of radial bores 288 along the handle plane HP.

Figure 12:
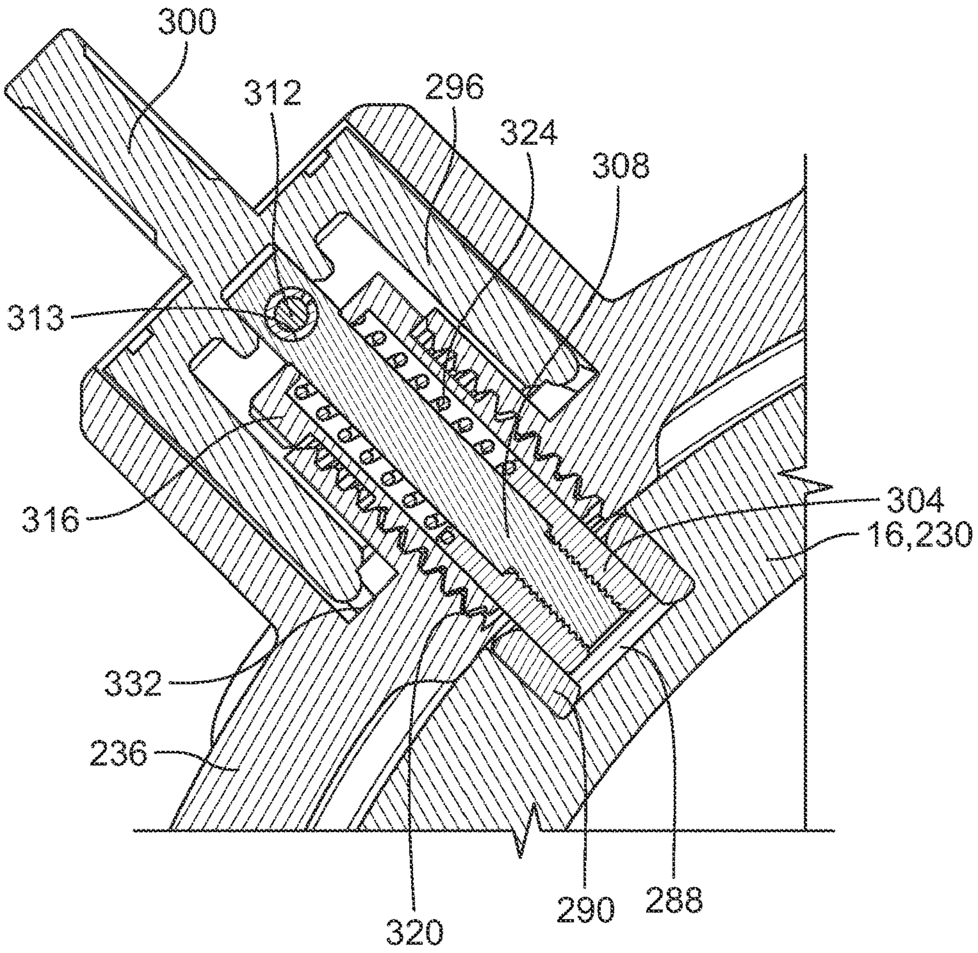
FIG. 12 is a cross-sectional view of a collar lock assembly of the auxiliary handle assembly of FIG. 8, with a first actuator knob in a first position and a detent in a first position.
Figure 13:
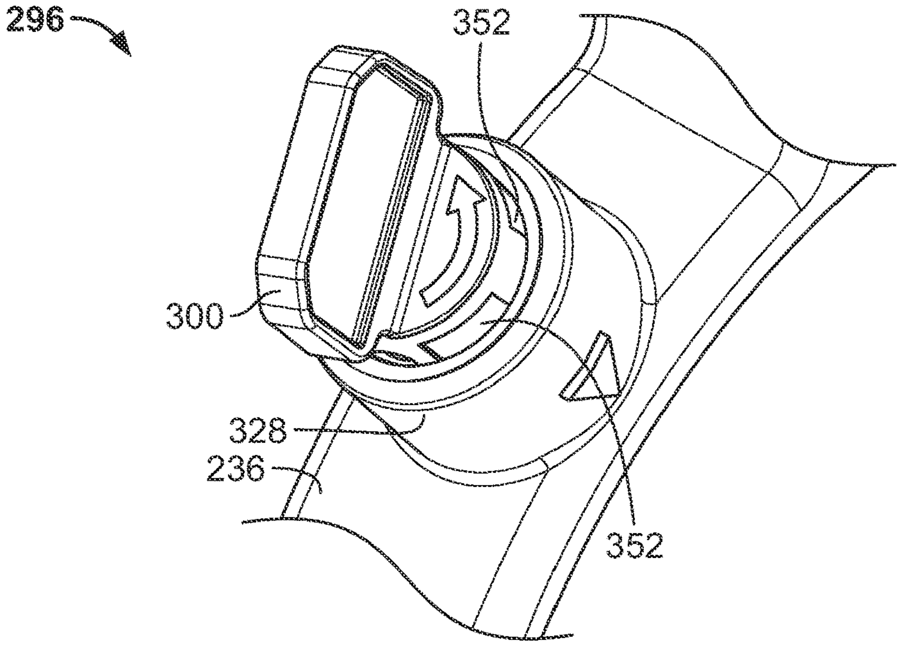
FIG. 13 is an enlarged perspective view of a collar lock assembly of the auxiliary handle assembly of FIG. 8, with a first actuator knob in a second position.

As shown in FIGS. 8, 9, and 11-18, the collar 236 also includes a collar lock assembly 296. The collar lock assembly 296 includes a first actuator knob 300 that is coupled to a detent 304 via a threaded member 308, with the threaded member 308 being coupled to the first actuator knob 300 via a transverse pin 312 that passes through bores 313, 314 respectively arranged in the threaded member 308 and the first actuator knob 300. The collar lock assembly 296 also includes a spring seat member 316 that is threaded into a threaded bore 320 of the collar 236. A collar lock assembly spring 324 is arranged inside and seated against the spring seat member 316, such that the spring 324 biases the detent 304, and thus the threaded member 308 and first actuator knob 300, radially inward and toward the motor axis 32. Thus, the detent 304 is biased toward a first position in which the detent 304 is received in one of the bores 288, as shown in FIG. 12. In the illustrated embodiment, the threaded member 308 extends centrally through the spring seat member 316 and the spring 324.

Figure 9:
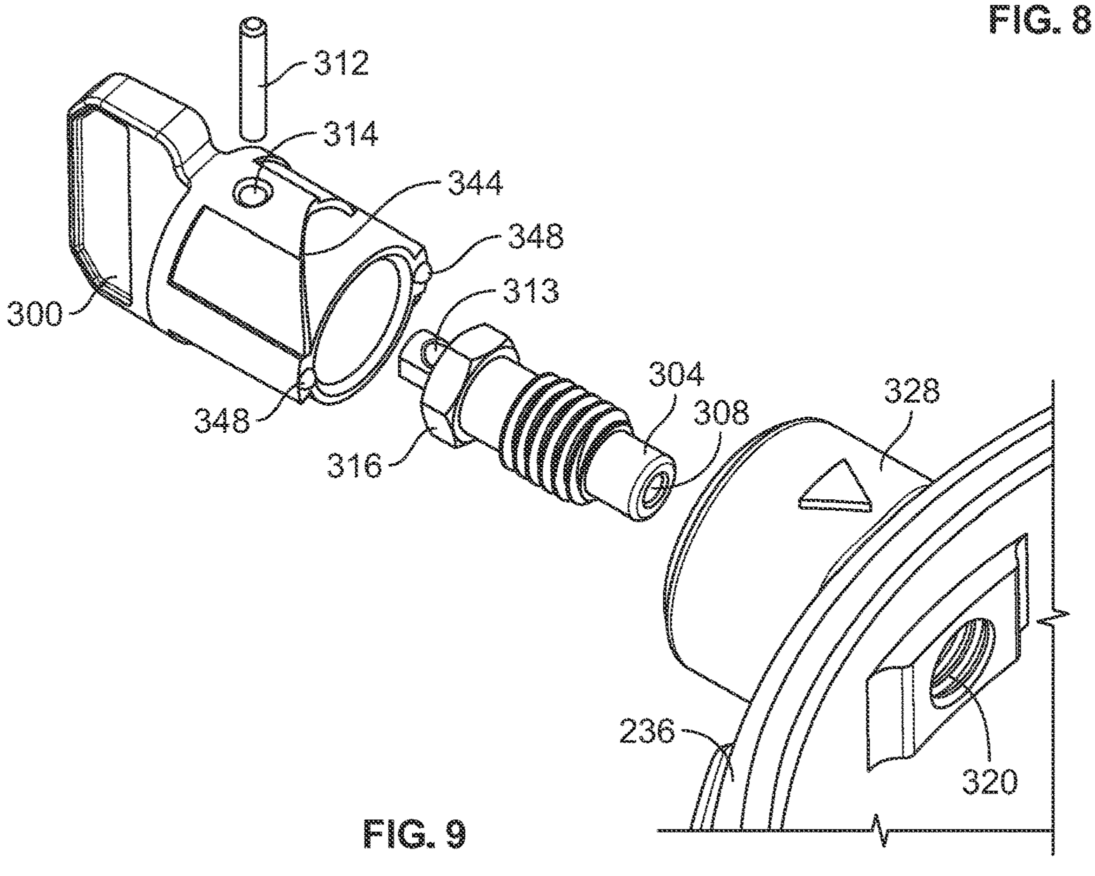
FIG. 9 is an exploded view of a collar lock assembly of the auxiliary handle assembly of FIG. 8.
Figure 10:
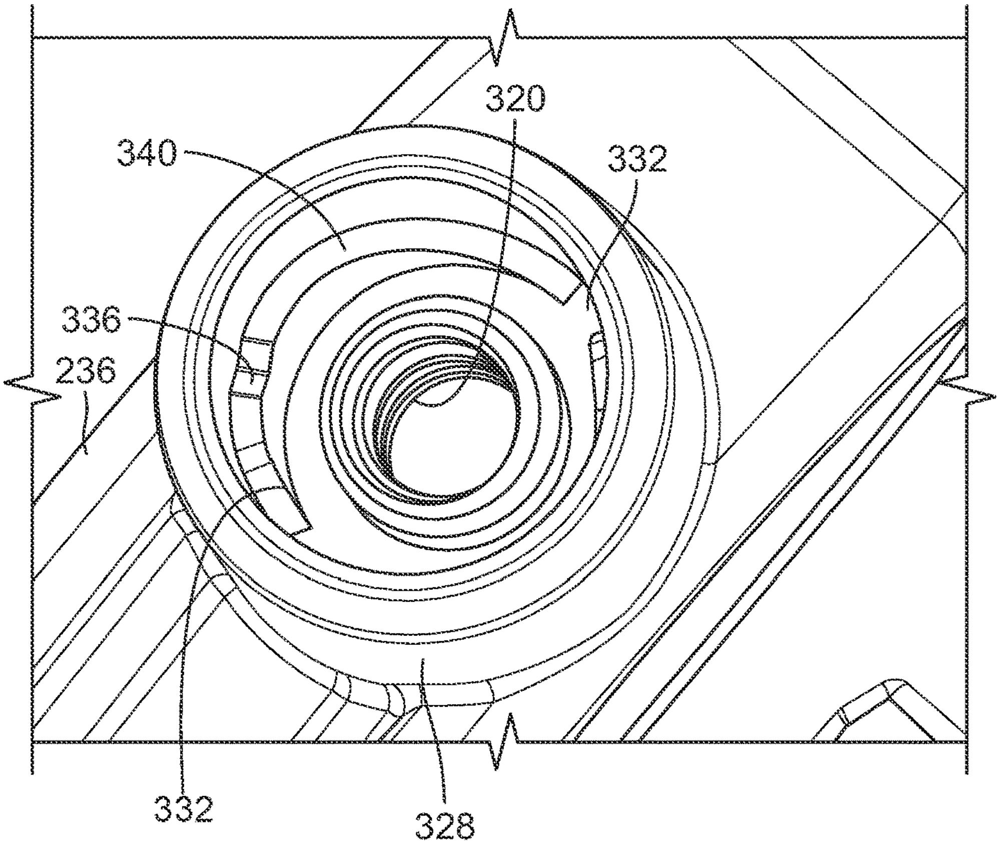
FIG. 10 is an enlarged perspective view of a collar of the auxiliary handle assembly of FIG. 8.
Figure 11:
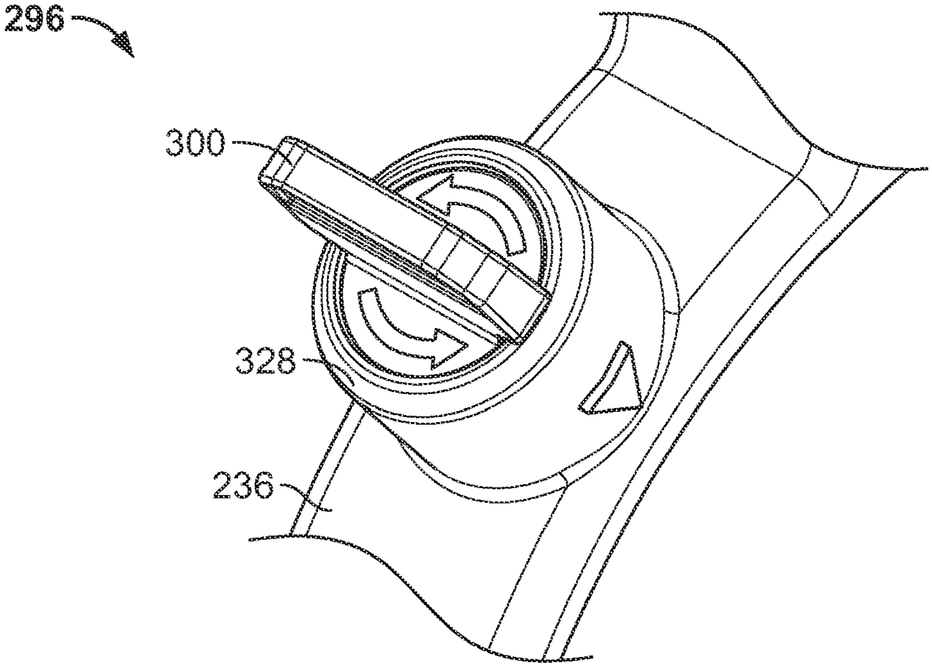
FIG. 11 is an enlarged perspective view of a collar lock assembly of the auxiliary handle assembly of FIG. 8, with a first actuator knob in a first position.

With reference to FIG. 10, the collar 236 includes a well 328 in which the threaded bore 320 of the collar 236 is arranged. The well 328 includes a pair of bottom surfaces 332, a pair of top recesses 336 (only one shown), and a pair of identical cam surfaces 340 (only one shown) that are respectively arranged between the bottom surfaces 332 and top recesses 336. With reference to FIG. 9, the first actuator knob 300 includes a pair of cam surfaces 344 (only one shown) and a pair of projections or detents 348.

Figure 14:
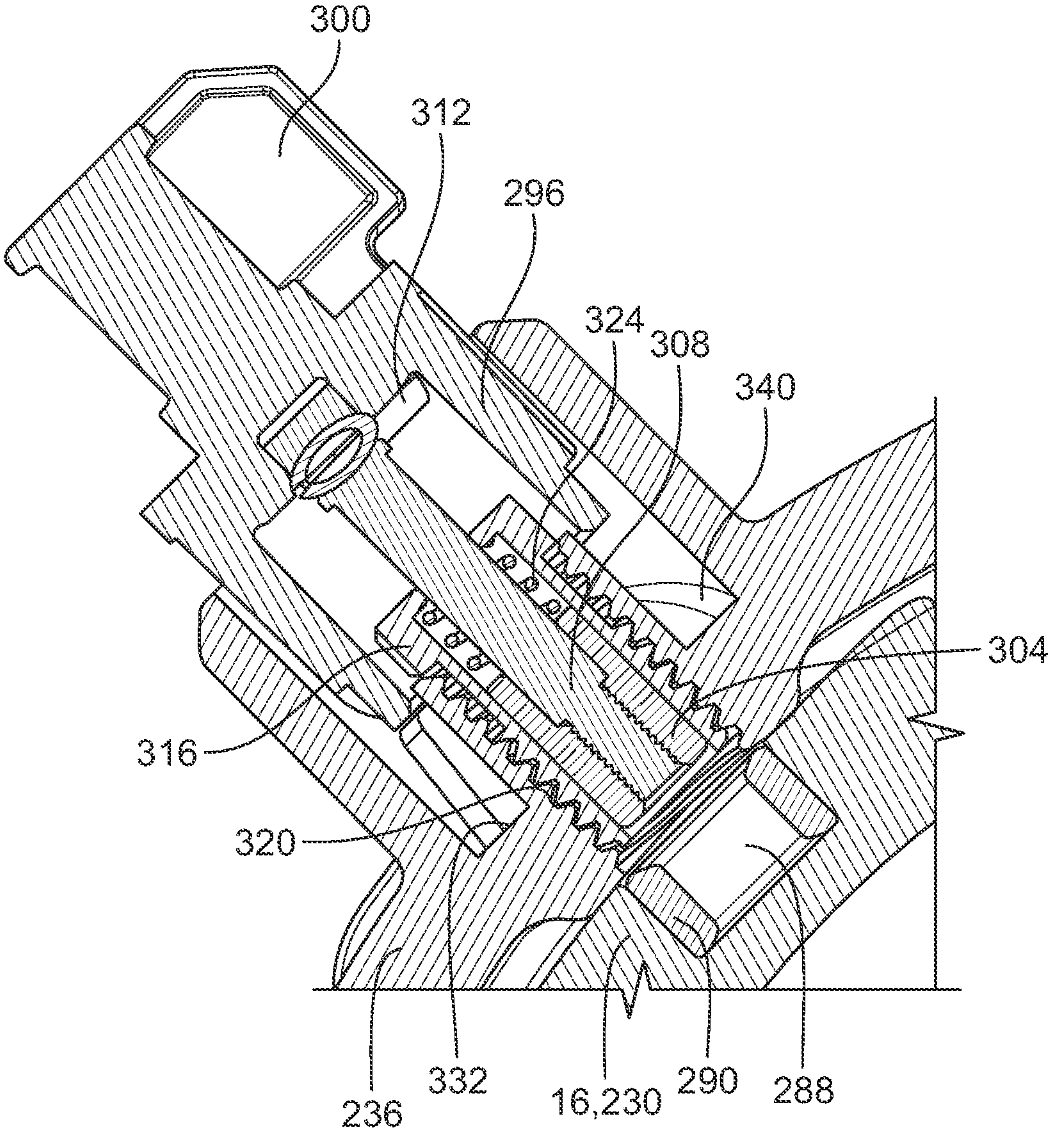
FIG. 14 is a cross-sectional view of a collar lock assembly of the auxiliary handle assembly of FIG. 8, with a first actuator knob in a second position a detent in a second position.
Figure 18:
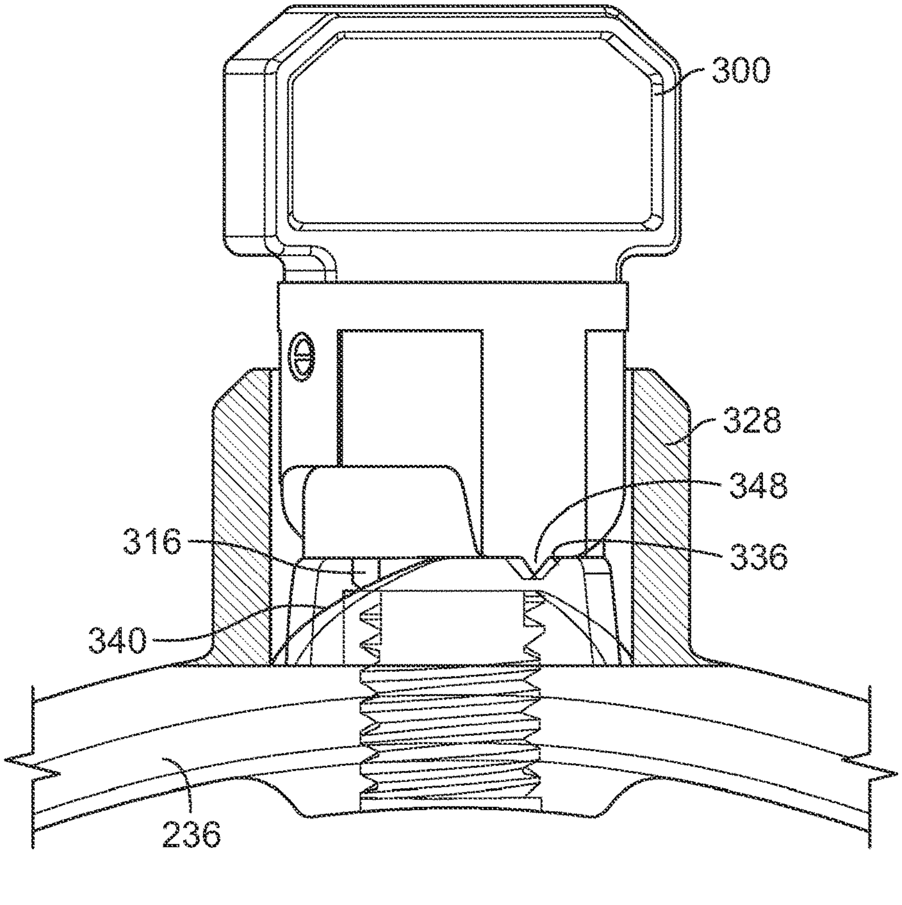
FIG. 18 is a plan view of the collar lock assembly of FIG. 11 with the first actuator knob in the second position.
Figure 19:
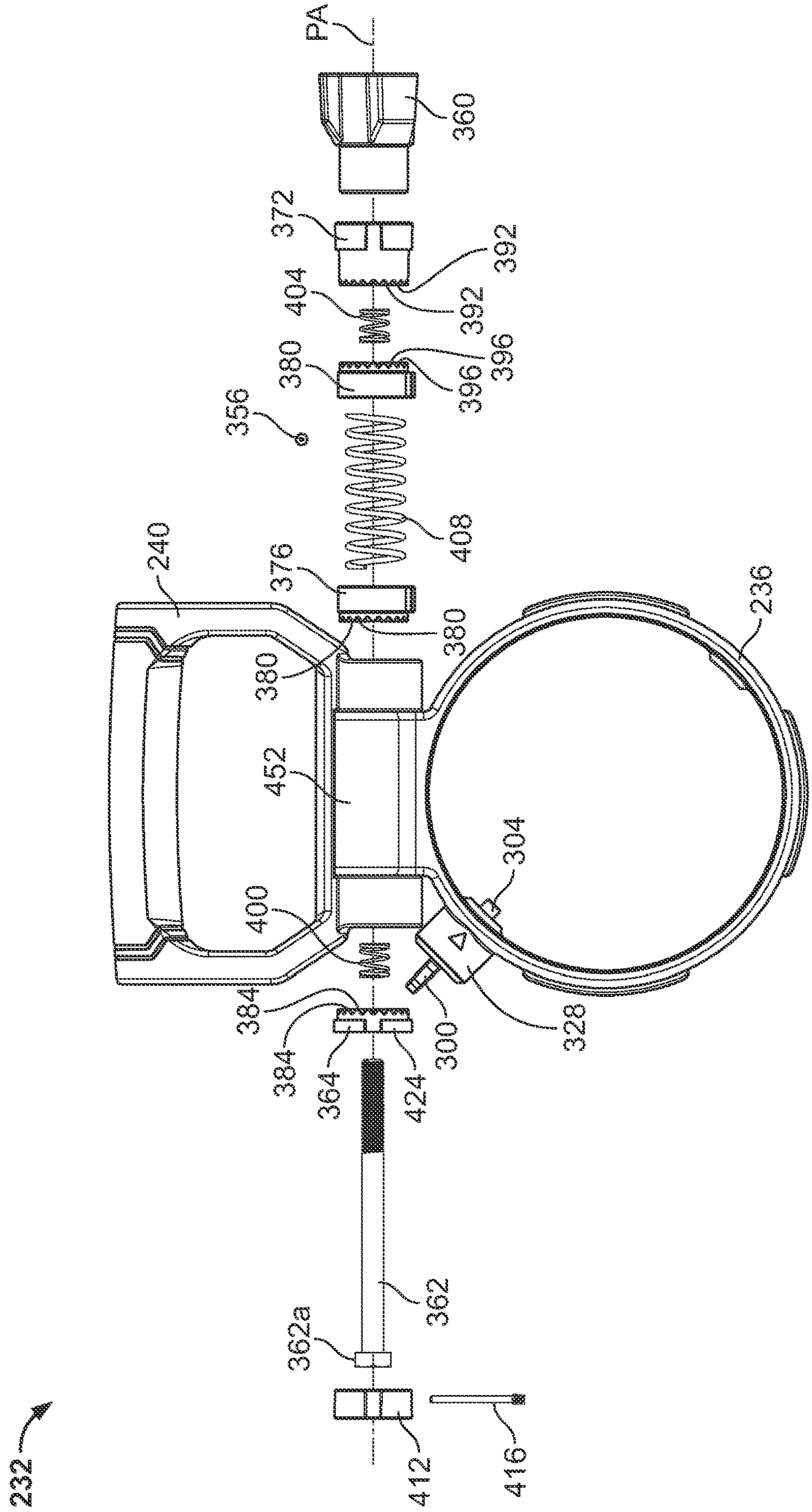
FIG. 19 is an exploded view of a handle lock assembly of the auxiliary handle assembly of FIG. 8.

To switch the rotational orientation of the collar 236 with respect to the rear portion 230 of the impact housing portion 16, the operator must first disengage the detent 304 from the bore 288 in which it is arranged. Thus, the operator rotates the first actuator knob 300 counterclockwise, as viewed chronologically in FIGS. 15-18. As the operator rotates the first actuator knob 300, the detents 348 of the first actuator knob 300 move along the cam surfaces 340 of the well 238, until the detents reach a position shown in FIG. 18, at which point the spring 324 biases the detents 348 into the top recesses 336. At this point, the detent 304 has been moved to a second position, in which the detent 304 is out of the bore 288 in which it was arranged, as shown in FIGS. 14 and 18. When the detent 304 is in the second position, a plurality of red indicators 352 (FIG. 13) on the first actuator knob 300 are exposed from the well 328 to alert the operator that the collar lock assembly 296 is in an unlocked state, such that the collar 296 is rotationally moveable with respect to the impact housing portion 16.

Figure 15:
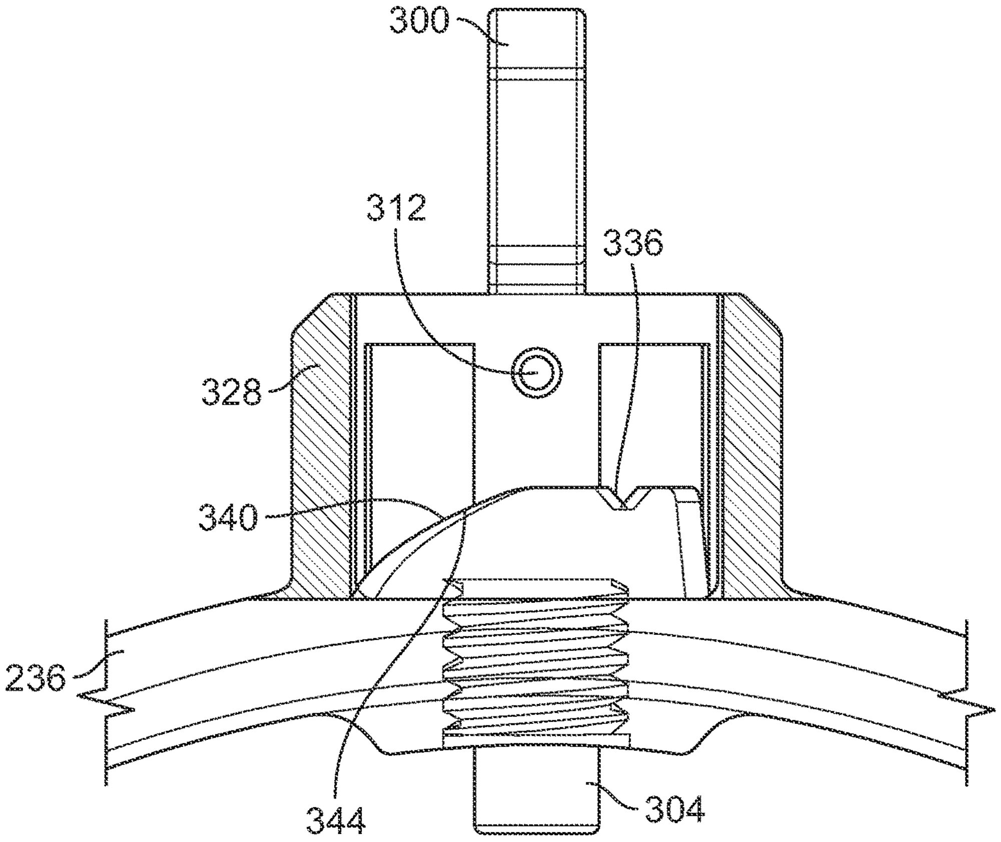
FIG. 15 is a plan view of the collar lock assembly of FIG. 11 with the first actuator knob in the first position.
Figure 16:
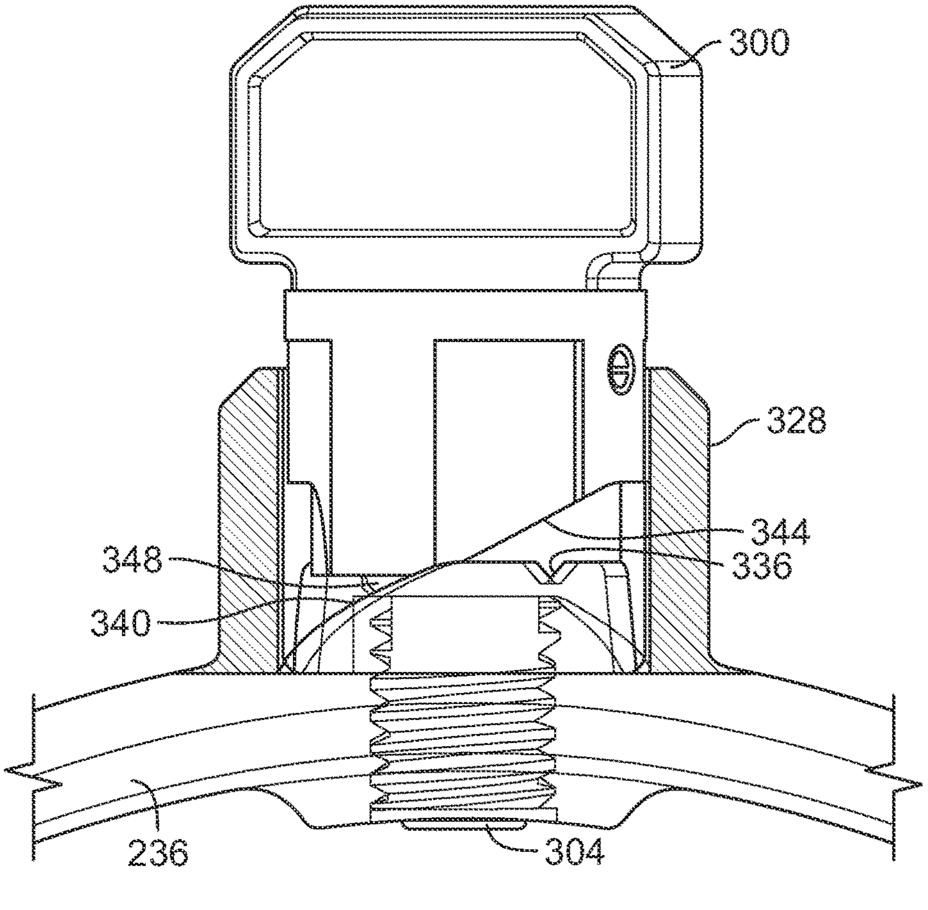
FIG. 16 is a plan view of the collar lock assembly of FIG. 11 with the first actuator knob in between the first and second positions.
Figure 17:
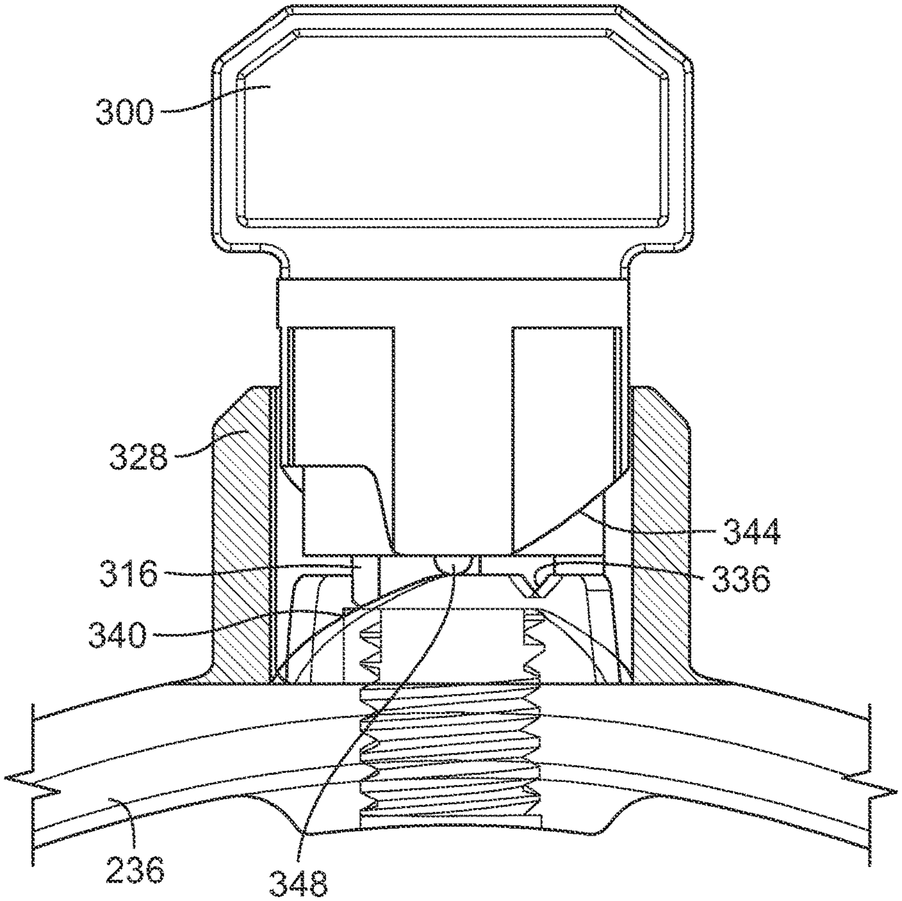
FIG. 17 is a plan view of the collar lock assembly of FIG. 11 with the first actuator knob in between the first and second positions.

The operator may then rotate the collar 236 with respect to the impact housing portion 16 to a new rotational position in which the detent 304 is aligned with a new bore 288. To secure the collar 236 in the new rotational position, the operator rotates the first actuator knob 300 clockwise as viewed in order of FIG. 18, FIG. 17, FIG. 16, and FIG. 15, until the detents 348 of the first actuator knob 260 reach the bottom surfaces 332 of the well 328 and the detent 304 is arranged in the first position in the new bore 288 (see FIGS. 11, 12, and 15), such that the collar 236 is once again rotationally locked with respect to the impact housing portion 16 in the new rotational position. When the detent 304 has reached the first position in the new bore 288, the cam surfaces 344 of the first actuator knob 260 are respectively mated against the cam surfaces 340 of the well 328, as shown in FIG. 15.

Figure 20:
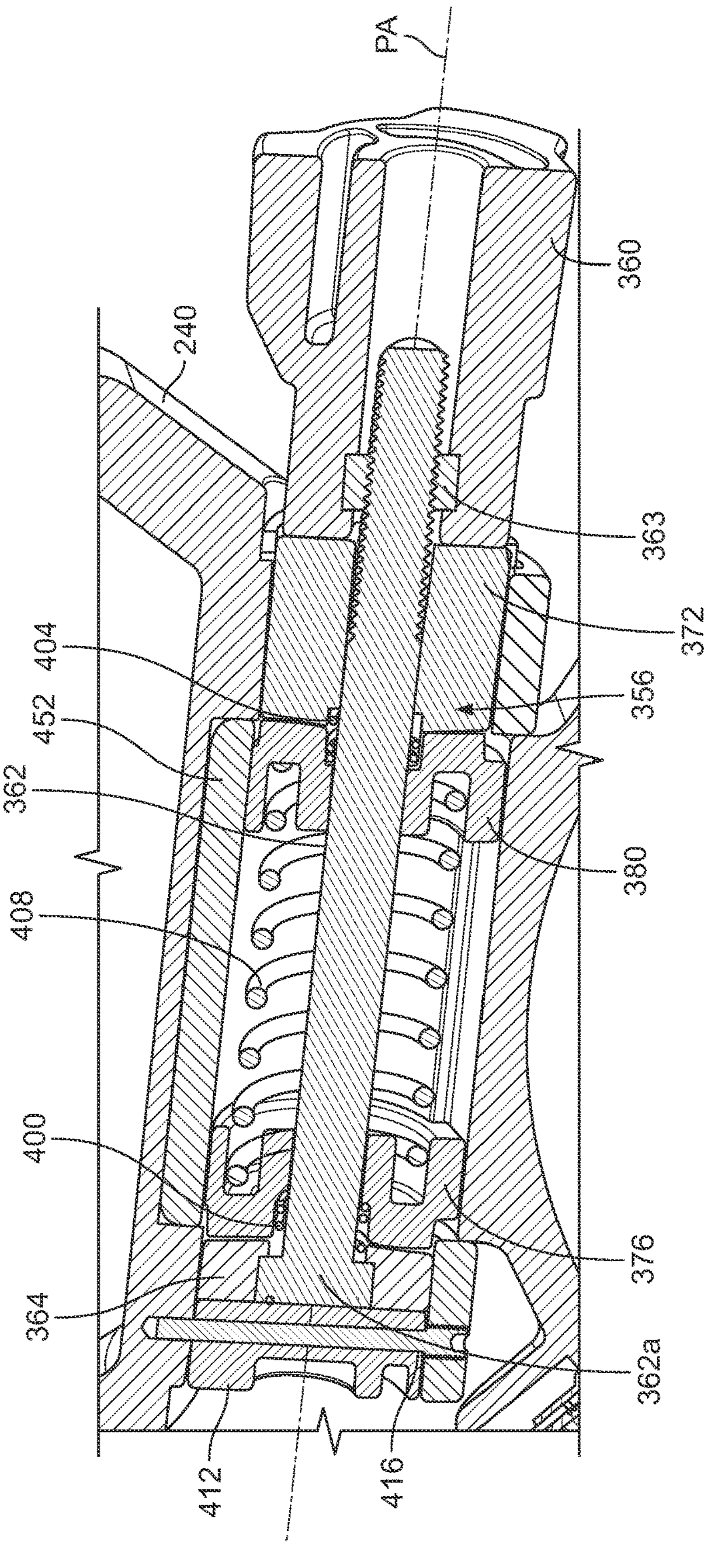
FIG. 20 is a cross-sectional view of a handle lock assembly of the auxiliary handle assembly of FIG. 8, with a second actuator knob in a first position.

As shown in FIGS. 8 and 19-27, the auxiliary handle assembly 232 includes a handle lock assembly 356 to selectively lock the handle 240 with respect to the collar 236. The handle lock assembly 356 includes a second actuator knob 360 that is coupled to a threaded fastener 362 via a nut 363. The threaded fastener 362 defines a pivot axis PA and has an end 362*a* arranged in a first outer jaw 364 that is arranged in the handle 240. As shown in FIG. 20, the threaded fastener 362 extends through a second outer jaw 372, as well as first and second inner jaws 376, 380. The first outer jaw 364 has a first plurality of outer teeth 384 that mesh with a first plurality of inner teeth 388 on the first inner jaw 376. The second outer jaw 372 has a second plurality of outer teeth 392 that mesh with a second plurality of inner teeth 396 on the second inner jaw 380. A first spring 400 is arranged between the first outer jaw 364 and first inner jaw 376, such that the first inner jaw 376 is biased away from the first outer jaw 364. A second spring 404 is arranged between the second outer jaw 372 and the second inner jaw 380, such that the second outer jaw 372 is biased away from the second inner jaw 380. A central spring 408 is arranged between the first and second inner jaws 376, 380, such that the first and second inner jaws 376, 380 are biased away from one another. An end cap 412 is arranged adjacent the first outer jaw 364 within the handle 240 and secured to the handle 240 via a pin 416, such that when the handle 240 is being adjusted with respect to the collar 236 as described in further detail below, the handle lock assembly 356 does not move back and forth along the pivot axis PA.

Figure 21:
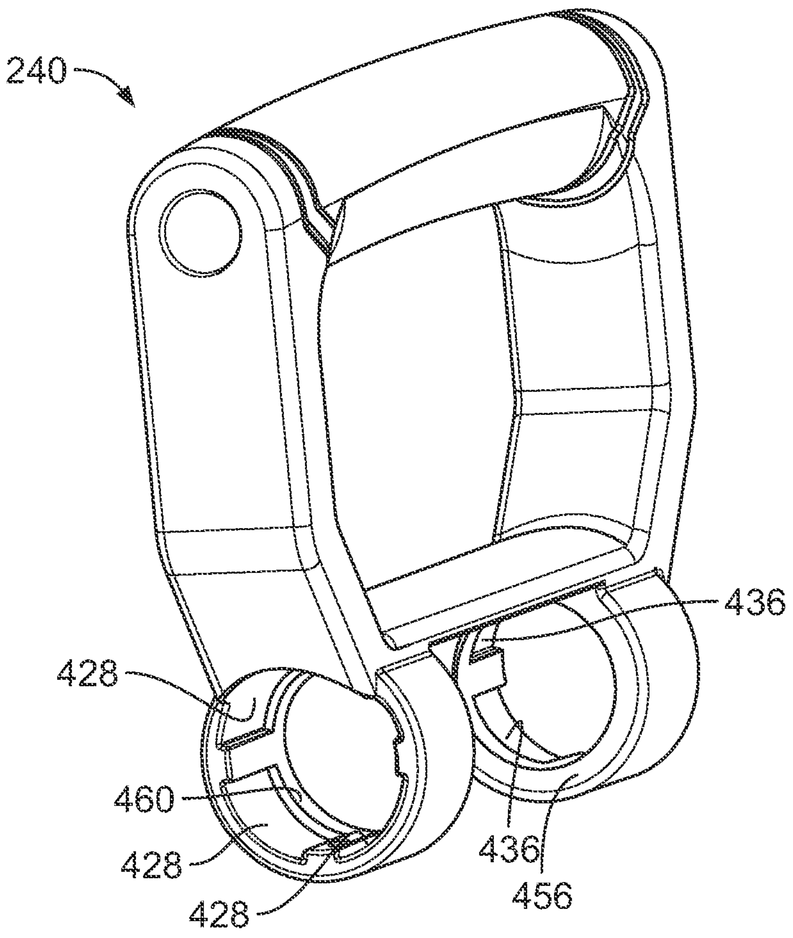
FIG. 21 is a perspective view of a handle of the auxiliary handle assembly of FIG. 8.
Figure 22:
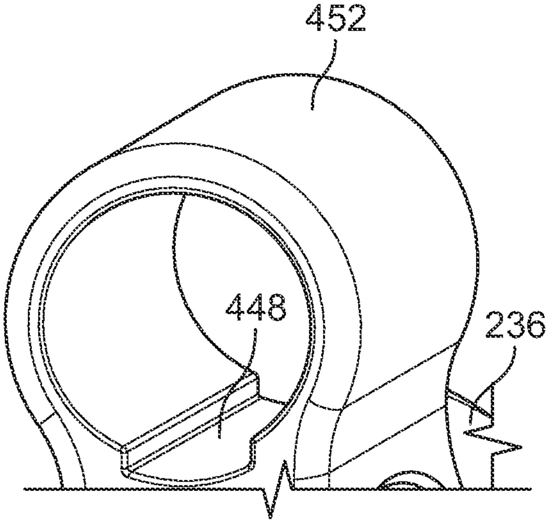
FIG. 22 is an enlarged perspective view of a collar of the auxiliary handle assembly of FIG. 8.
Figure 23:
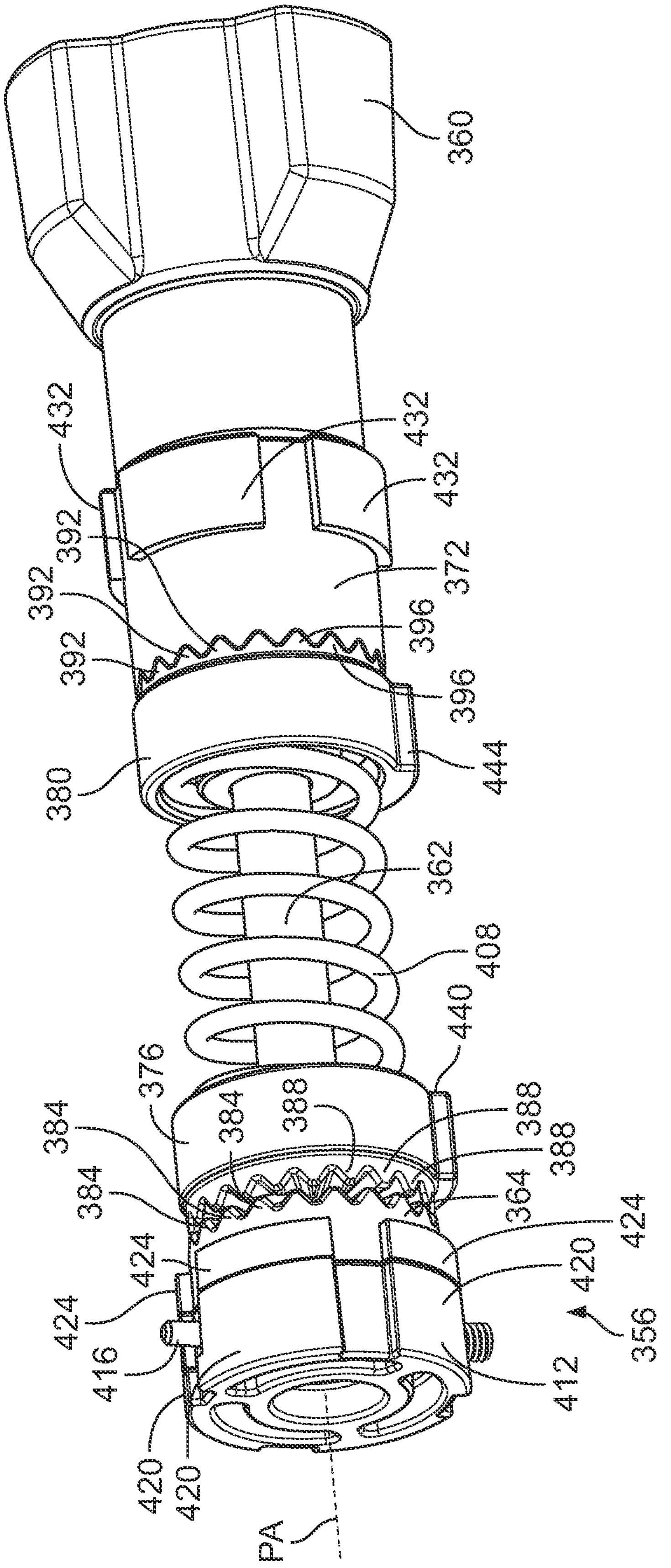
FIG. 23 is a perspective view of the handle lock assembly of FIG. 20.
Figure 24:
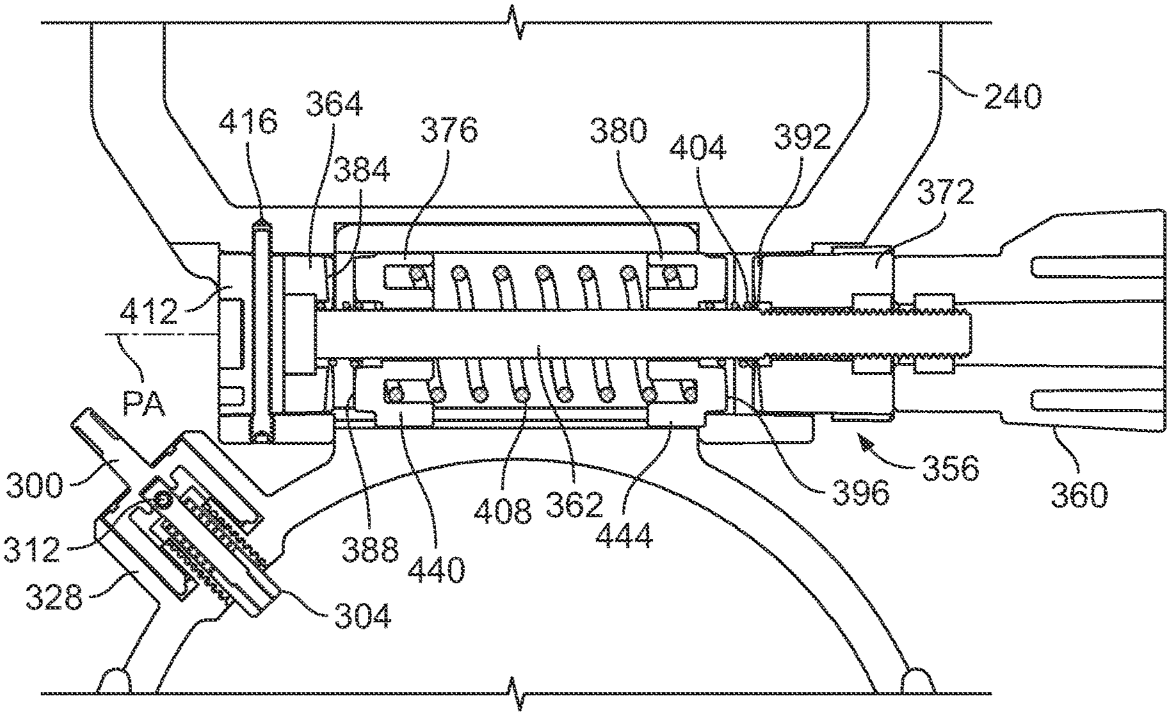
FIG. 24 is a plan view of the handle lock assembly of FIG. 20, with a second actuator knob in a second position.

As shown in FIGS. 21-23, the end cap 412 has ribs 420 and the first outer jaw 364 has ribs 424 that are arranged in corresponding recesses 428 of the handle 240, such that the end cap 412 and first outer jaw 364 are coupled for rotation with the handle 240 about the pivot axis PA. Likewise, the second outer jaw 372 has ribs 432 that are arranged in corresponding recesses 436 of the handle 240, such that the second outer jaw 372 is coupled for rotation with the handle 240 when arranged inside of the handle 240. With continued reference to FIGS. 21-23, the first and second inner jaws 376, 380 respectively have ribs 440, 444 that are arranged in a recess 448 of a loop 452 on the collar 236, such that the first and second inner jaws 376, 380 are inhibited from rotation about the pivot axis PA.

When the operator desires to adjust the position of the handle 240 with respect to the collar 236, the operator first rotates the second actuator knob 360 about the pivot axis PA, such that the nut 363 and second actuator knob 360 move away from the second outer jaw 372 along the threaded fastener 362. Once the second actuator knob 360 has been moved to a first, unlocked, position shown in FIG. 24, the first spring 400 is able to bias the first inner jaw 376 from the first outer jaw 364, such that first plurality of outer teeth 384 are no longer engaged with the first plurality of inner teeth 388. Also, once the second actuator knob 360 has been moved to the first position shown in FIG. 24, the second spring 404 is able to bias the second outer jaw 372 from the second inner jaw 380, such that the second plurality of outer teeth 392 are no longer engaged with the second plurality of inner teeth 396. The central spring 408 is inhibited from biasing the second inner jaw 380 into contact with the second outer jaw 372 because the second inner jaw 380 is blocked by a second inner rim 456 (FIG. 21) of the handle 240.

At this point, the operator may now pivot the handle 240 about the pivot axis PA to a new position with respect to the collar 236. As the handle 240 pivots, the first outer jaw 364 and end cap 412 pivot therewith. However, the second outer jaw 372 does not pivot with the handle 240, because in the first position of the second actuator knob 360, the second outer jaw 372 has been biased by the second spring 404 to a position in which the ribs 432 are no longer arranged in the corresponding recesses 436 of the handle 240.

Figure 25:
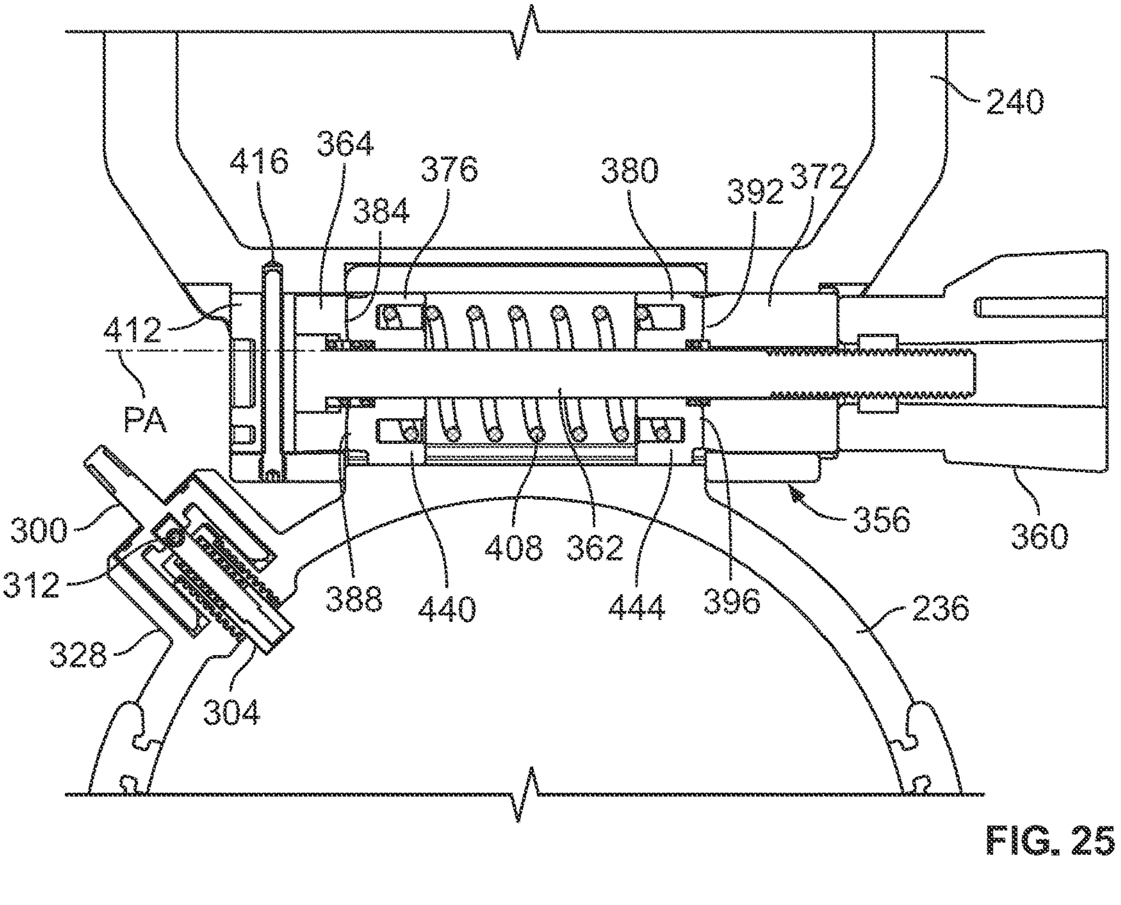
FIG. 25 is a plan view of the handle lock assembly of FIG. 20, with a second actuator knob in a first position.

Once the handle 240 has been pivoted to the new position with respect to the collar 236, the operator then rotates the second actuator knob 360 until it is moved to a second, locked, position shown in FIG. 25. Movement of the second actuator knob 360 to the second position moves the second outer jaw 372 back toward the second inner jaw 380, such that the second plurality of outer teeth 312 are engaged with the second plurality of inner teeth 396. Also, as the second inner jaw 380 is moved inward by the second outer jaw 372, the second inner jaw 380 moves, via the central spring 408, the first inner jaw 376, into abutting contact with a first inner rim 460 (FIG. 21) of the handle 240, and thus, into engagement with the first outer jaw 364, such that first plurality of outer teeth 384 are engaged with the first plurality of inner teeth 388. Now, if the operator attempts to pivot the handle 240 with respect to the collar 236, the operator will be prevented because the first outer and inner jaws 364, 376 are engaged, and the second outer and inner jaws 372, 380 are engaged. And, because the first and second inner jaws 376, 380 are inhibited from rotation, so are the first and second outer jaws 364, 372. Therefore, the handle 240 is inhibited from pivoting about the pivot axis PA with respect the collar 236. Thus, the handle 240 is now locked in position with respect to the collar 236.

Figure 27:
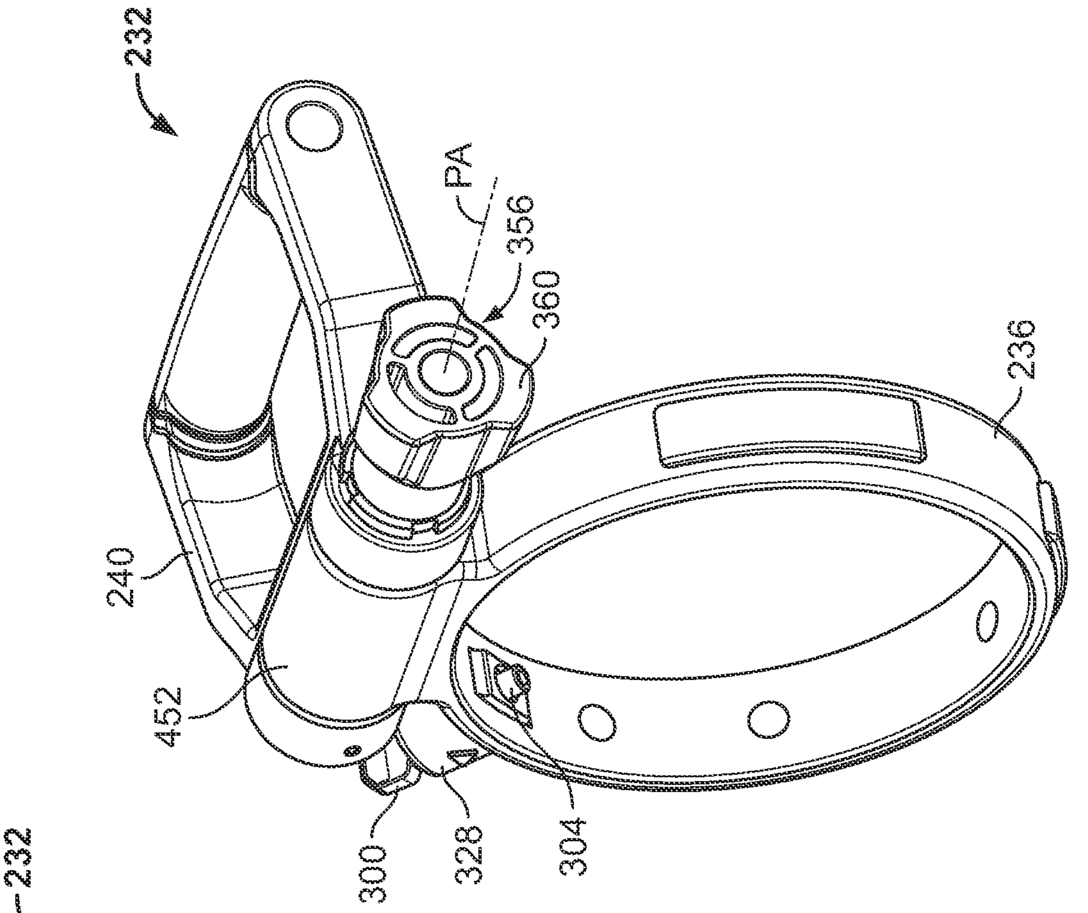
FIG. 27 is a plan view of the handle lock assembly of FIG. 20, with a handle in a deflected position.
Figure 26:
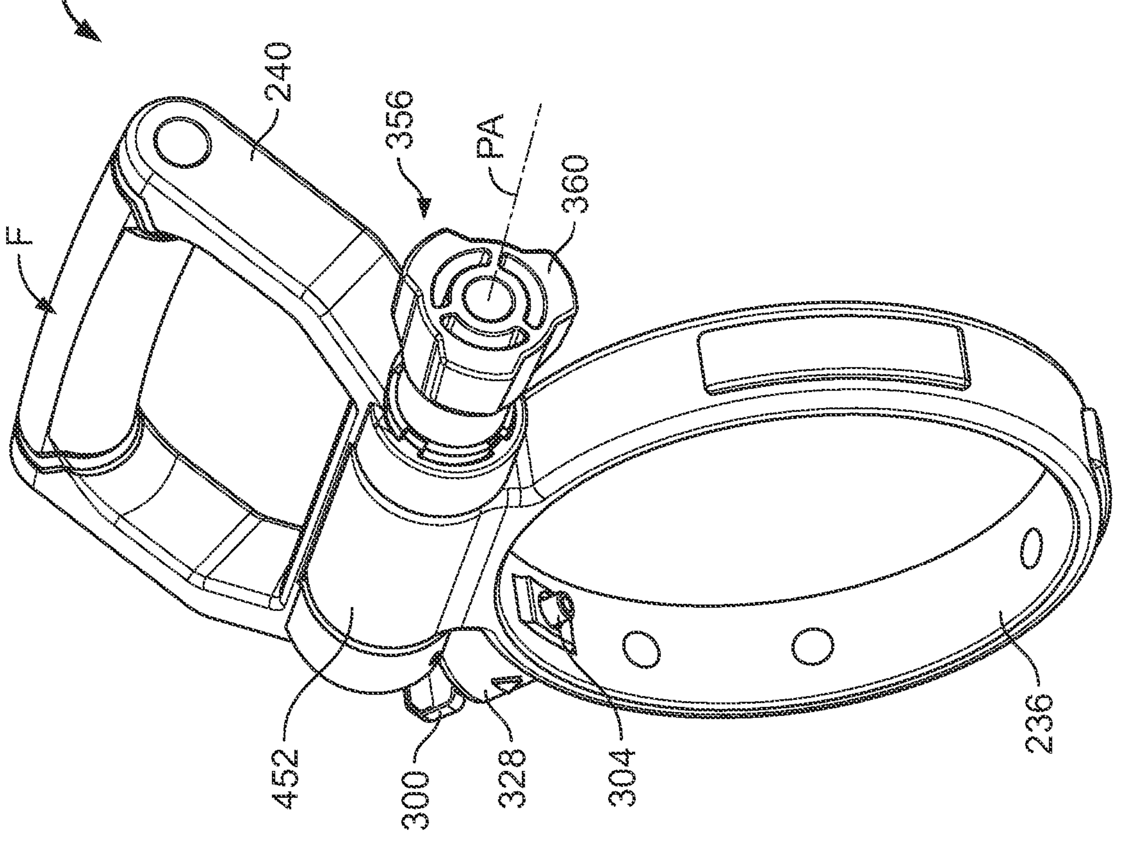
FIG. 26 is a plan view of the handle lock assembly of FIG. 20, with a handle receiving an impact force.
Figure 28:
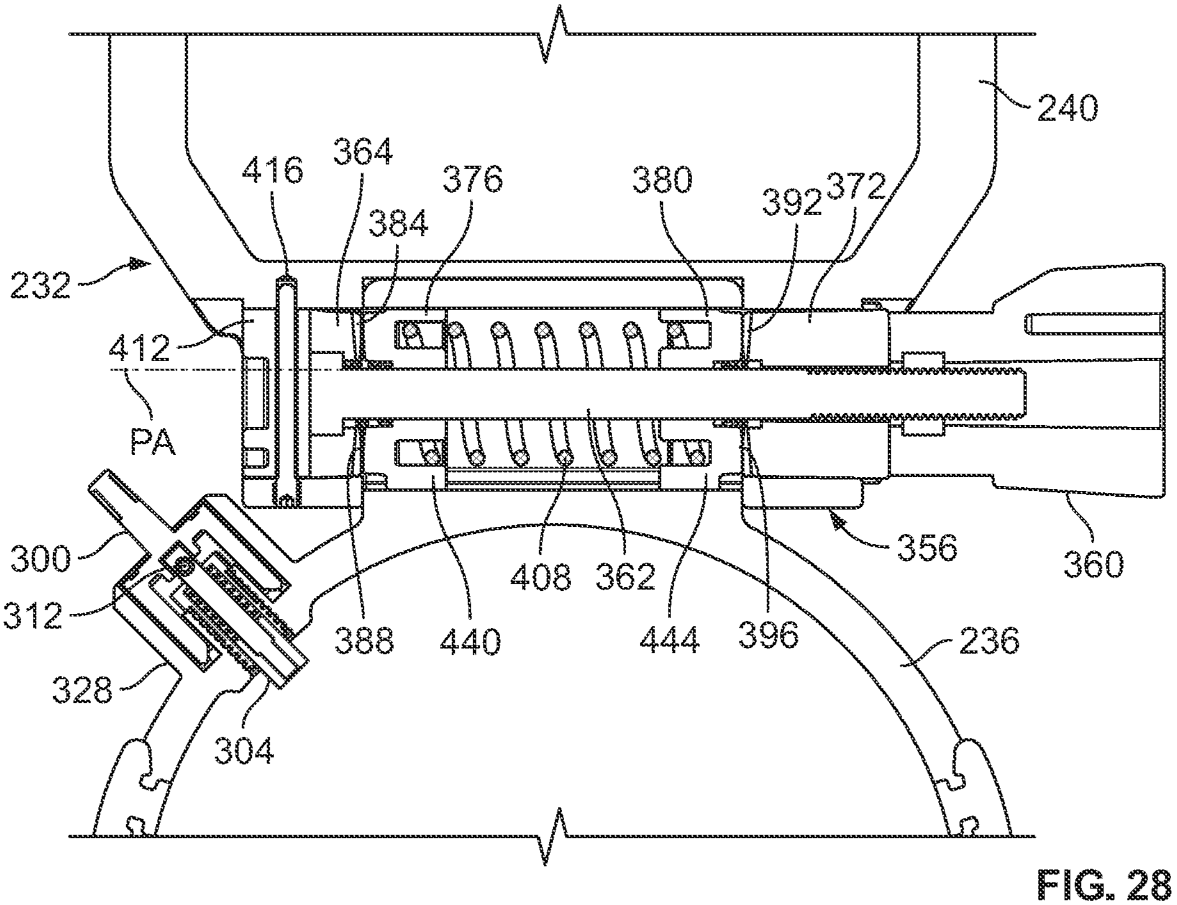
FIG. 28 is a plan view of the handle lock assembly of FIG. 20, with the handle lock assembly illustrating a response to the handle receiving an impact force.

During operation of the impact wrench, a force F is applied to the handle 240 (as shown in FIG. 26) while the second actuator knob 260 is in the second, locked position, thereby causing the first and second outer jaws 364, 372 to rotate with the handle 240. However, because the first and second inner jaws 376, 380 are inhibited from rotating, the sudden rotation of the first and second outer jaws 364, 372 respectively move the first and second inner jaws 376, 380 toward each other, causing the central spring 408 to compress, such that the first and second inner jaws 376, 380 momentarily disengage the first and second outer jaws 364, 372, thereby preventing damage to the handle lock assembly 356, handle 240, and collar 236. Once the force F is removed and the handle 240 has settled in a new position (as shown in FIG. 27), the central spring 408 rebounds, forcing the first and second inner jaws 376, 380 back into respective engagement with the first and second outer jaws 364, 372, thereby again locking the handle 240 with respect to the collar 236, as shown in FIG. 25.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. An impact tool comprising:

a housing including a motor housing portion and an impact housing portion, the impact housing portion having a front end defining a front-end plane;

an electric motor supported in the motor housing and defining a motor axis;

a battery pack supported by the housing for providing power to the motor; and a drive assembly supported by the impact housing portion, the drive assembly configured to convert a continuous rotational input from the motor to consecutive rotational impacts upon a workpiece, the drive assembly including an anvil extending from the front end of the impact housing portion, the anvil having an end defining an anvil end plane, a hammer that is both rotationally and axially movable relative to the anvil for imparting the consecutive rotational impacts upon the anvil, and a spring for biasing the hammer in an axial direction toward the anvil, wherein a distance between the front-end plane and the anvil end plane is greater than or equal to 6 inches;

an actuator on a top surface of the housing, the actuator moveable between a first position and a second position;

wherein in response to the actuator being in the first position, the electric motor is configured to rotate in a first direction; and wherein in response to the actuator being the second position, the electric motor is configured to rotate in a second direction that is opposite the first direction.

2. The impact tool of claim 1, wherein the impact housing portion includes a front portion extending rearward from the front end and a rear portion between the front portion and the motor housing portion, wherein the front portion defines a first height, wherein the rear portion defines a second height, and wherein a ratio of the second height to the first height is between 1.5 and 2.0.

3. The impact tool of claim 2, wherein the first height is 3.1 inches, and wherein the second height is 5.2 inches.

4. The impact tool of claim 1, further comprising an auxiliary handle assembly including a collar arranged on the impact housing portion and a handle coupled to the collar, the collar defining a handle plane that extends centrally through the collar, orthogonal to the motor axis, and that is parallel with the front-end plane.

5. The impact tool of claim 4, wherein a distance between the front-end plane and the handle plane is greater than or equal to 6 inches.

6. The impact tool of claim 4, wherein the housing includes a handle portion having a rear surface defining a rear end of the impact tool and defining a rear-end plane, wherein a distance between the rear-end plane and the handle plane is less than or equal to 13.5 inches.

7. The impact tool of claim 1, wherein the housing includes a handle portion having a rear surface defining a rear end of the impact tool and defining a rear-end plane, and wherein a distance between the rear-end plane and the anvil end plane is less than or equal to 19.5 inches.

8. The impact tool of claim 7, wherein the handle portion includes a grip spaced from the motor housing portion to define an aperture therebetween, and wherein the impact tool further comprises a trigger for operating the impact tool, the trigger extending from the grip and into the aperture.

9. The impact tool of claim 1, further comprising an auxiliary handle assembly including a collar arranged on the impact housing portion and a handle coupled to the collar, the collar defining a handle plane that extends centrally through the collar, orthogonal to the motor axis, and that is parallel with the front-end plane, wherein the collar includes a collar lock assembly including a detent moveable between a first position, in which the detent is arranged in a bore of the impact housing portion and the collar is rotationally locked with respect to the impact housing portion, and a second position, in which the detent is out of the bore and the collar is rotationally moveable with respect to the impact housing portion.

10. The impact tool of claim 9, wherein the handle includes a handle lock assembly switchable between a first state, in which the handle is pivotal with respect to the collar, and a second state, in which the handle is locked with respect to the collar.

11. An impact tool comprising:

a housing including a motor housing portion, a handle portion, and an impact housing portion, the impact housing portion having a front end defining a front-end plane, the handle portion including a grip spaced from the motor housing portion to define an aperture therebetween and a connecting portion extending between the grip and the motor housing portion;

an electric motor supported in the motor housing and defining a motor axis;

a battery pack supported by the housing for providing power to the motor;

a drive assembly supported by the impact housing portion, the drive assembly configured to convert a continuous rotational input from the motor to consecutive rotational impacts upon a workpiece, the drive assembly including an anvil, a hammer that is both rotationally and axially movable relative to the anvil for imparting the consecutive rotational impacts upon the anvil, and a spring for biasing the hammer in an axial direction toward the anvil; and an auxiliary handle assembly including a collar arranged on the impact housing portion and a handle coupled to the collar, the collar defining a handle plane that extends centrally through the collar, orthogonal to the motor axis, and that is parallel with the front-end plane;

an actuator located on the connecting portion between the grip and the motor housing portion, the actuator moveable between a first position and a second position;

wherein in response to the actuator being in the first position, the electric motor is configured to rotate in a first direction; and wherein in response to the actuator being the second position, the electric motor is configured to rotate in a second direction that is opposite the first direction.

12. The impact tool of claim 11, wherein the impact housing portion includes a front portion extending rearward from the front end and a rear portion between the front portion and the motor housing portion, wherein the front portion defines a first height, wherein the rear portion defines a second height, and wherein a ratio of the second height to the first height is between 1.5 and 2.0.

13. The impact tool of claim 11, wherein the handle portion includes a rear surface defining a rear end of the impact tool and defining a rear end plane, wherein a distance between the rear end plane and the handle plane is less than or equal to 13.5 inches.

14. The impact tool of claim 11, wherein the anvil has an end defining an anvil end plane parallel with the front-end plane, wherein the handle portion includes a rear surface defining a rear end of the impact tool and defining a rear-end plane, and wherein a distance between the rear-end plane and the anvil end plane is less than or equal to 19.5 inches.

15. The impact tool of claim 11, further comprising a trigger for operating the impact tool, the trigger extending from the grip and into the aperture.

16. An impact tool comprising:

a housing including a motor housing portion, an impact housing portion having a front end defining a front-end plane, and a handle portion having a rear surface defining a rear end of the impact tool and defining a rear-end plane;

an electric motor supported in the motor housing and defining a motor axis;

a battery pack supported by the housing for providing power to the motor;

a drive assembly supported by the impact housing portion, the drive assembly configured to convert a continuous rotational input from the motor to consecutive rotational impacts upon a workpiece, the drive assembly including an anvil having an end defining an anvil end plane, a hammer that is both rotationally and axially movable relative to the anvil for imparting the consecutive rotational impacts upon the anvil, and a spring for biasing the hammer in an axial direction toward the anvil; and an actuator on a top surface of the handle portion, the actuator moveable between a first position and a second position, wherein in response to the actuator being in the first position, the electric motor is configured to rotate in a first direction, and wherein in response to the actuator being the second position, the electric motor is configured to rotate in a second direction that is opposite the first direction.

17. The impact tool of claim 16, wherein the impact housing portion includes a front portion extending rearward from the front end and a rear portion between the front portion and the motor housing portion, wherein the front portion defines a first height, wherein the rear portion defines a second height, and wherein a ratio of the second height to the first height is between 1.5 and 2.0.

18. The impact tool of claim 16, further comprising an auxiliary handle assembly including a collar arranged on the impact housing portion and a handle coupled to the collar, the collar defining a handle plane that extends centrally through the collar, orthogonal to the motor axis, and that is parallel with the front-end plane.

19. The impact tool of claim 18, wherein a distance between the front-end plane and the handle plane is greater than or equal to 6 inches.

20. The impact tool of claim 18, wherein a distance between the rear-end plane and the handle plane is less than or equal to 13.5 inches.

* * * * *